United States Patent
Horvitz et al.

(10) Patent No.: US 7,743,340 B2
(45) Date of Patent: Jun. 22, 2010

(54) POSITIONING AND RENDERING NOTIFICATION HERALDS BASED ON USER'S FOCUS OF ATTENTION AND ACTIVITY

(75) Inventors: Eric J. Horvitz, Kirkland, WA (US); Johnson T. Apacible, Redmond, WA (US); Chaitanya D. Sareen, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1713 days.

(21) Appl. No.: 10/610,487

(22) Filed: Jun. 30, 2003

(65) Prior Publication Data

US 2004/0098462 A1 May 20, 2004

Related U.S. Application Data

(63) Continuation-in-part of application No. 10/220,550, filed as application No. PCT/US01/08710 on Mar. 16, 2001, application No. 10/610,487, which is a continuation-in-part of application No. 10/220,419, filed as application No. PCT/US01/08711 on Mar. 16, 2001, now Pat. No. 7,243,130.

(60) Provisional application No. 60/189,801, filed on Mar. 16, 2000.

(51) Int. Cl.
*G06F 3/048* (2006.01)

(52) U.S. Cl. .................. 715/808; 715/710; 715/711; 715/772; 715/774; 715/809

(58) Field of Classification Search ......... 715/710–711, 715/772, 774, 808–809
See application file for complete search history.

(56) References Cited

U.S. PATENT DOCUMENTS

| | | | |
|---|---|---|---|
| 4,789,962 A * | 12/1988 | Berry et al. | ............ 715/715 |
| 5,377,354 A | 12/1994 | Scannell et al. | |
| 5,423,043 A | 6/1995 | Fitzpatrick et al. | |

(Continued)

FOREIGN PATENT DOCUMENTS

EP 0375138 A2 6/1990

(Continued)

OTHER PUBLICATIONS

Horvitz, Eric, Jocobs, Andy, Hovel, David, Attention Sensitive Alerting, Jul. 1999, in Proceedings of UAI '99, Conference on Uncertainty and Artificial Intelligence, Morgan Kaufmann: San Francisco. pp. 305-313.*

(Continued)

*Primary Examiner*—Ting Lee
*Assistant Examiner*—Ashraf Zahr
(74) *Attorney, Agent, or Firm*—Wolf, Greenfield & Sacks, P.C.

(57) ABSTRACT

The present invention relates to a system and method to facilitate providing computer users with efficient access to electronic notifications while minimizing disruption in the context of ongoing tasks. A notification system provides visual information heralds that provide summarizations of notifications to users. An information controller considers the importance or urgency of content and a user's current and/or recent activities in decisions about the rendering and positioning of the information herald on a display screen or screens in order to facilitate user processing of the summarized notifications with minimal disruption to ongoing tasks.

46 Claims, 28 Drawing Sheets

U.S. PATENT DOCUMENTS

| | | |
|---|---|---|
| 5,471,399 A | 11/1995 | Tanaka et al. |
| 5,493,692 A | 2/1996 | Theimer et al. |
| 5,508,817 A | 4/1996 | Kuningami |
| 5,544,321 A | 8/1996 | Theimer et al. |
| 5,555,346 A | 9/1996 | Gross et al. |
| 5,555,376 A | 9/1996 | Theimer et al. |
| 5,603,054 A | 2/1997 | Theimer et al. |
| 5,611,050 A | 3/1997 | Theimer et al. |
| 5,615,325 A | 3/1997 | Peden |
| 5,644,363 A | 7/1997 | Mead |
| 5,717,877 A | 2/1998 | Orton et al. |
| 5,736,974 A | 4/1998 | Selker |
| 5,742,905 A | 4/1998 | Pepe et al. |
| 5,751,965 A | 5/1998 | Mayo et al. |
| 5,757,916 A | 5/1998 | MacDoran et al. |
| 5,767,852 A | 6/1998 | Keller et al. |
| 5,784,124 A | 7/1998 | D'Alitalia et al. |
| 5,812,865 A | 9/1998 | Theimer et al. |
| 5,831,545 A | 11/1998 | Murray et al. |
| 5,852,440 A | 12/1998 | Grossman et al. |
| 5,859,640 A | 1/1999 | de Judicibus |
| 5,864,848 A | 1/1999 | Horvitz |
| 5,928,330 A | 7/1999 | Goetz et al. |
| 5,973,612 A | 10/1999 | Deo et al. |
| 5,987,234 A * | 11/1999 | Hirosawa et al. ............ 709/224 |
| 6,021,403 A * | 2/2000 | Horvitz et al. ................ 706/45 |
| 6,055,505 A | 4/2000 | Elston |
| 6,057,842 A | 5/2000 | Knowlton et al. |
| 6,067,477 A | 5/2000 | Wewalaarachchi et al. |
| 6,067,565 A | 5/2000 | Horvitz |
| 6,078,322 A | 6/2000 | Simonoff et al. |
| 6,078,568 A | 6/2000 | Wright et al. |
| 6,094,681 A | 7/2000 | Shaffer et al. |
| 6,101,531 A | 8/2000 | Eggleston et al. |
| 6,144,363 A | 11/2000 | Alloul et al. |
| 6,167,448 A | 12/2000 | Hemphill et al. |
| 6,199,106 B1 | 3/2001 | Shaw et al. |
| 6,256,664 B1 | 7/2001 | Donoho et al. |
| 6,262,730 B1 | 7/2001 | Horvitz et al. |
| 6,289,380 B1 | 9/2001 | Battat et al. |
| 6,301,609 B1 | 10/2001 | Aravamudan et al. |
| 6,327,581 B1 | 12/2001 | Platt |
| 6,332,127 B1 | 12/2001 | Bandera et al. |
| 6,337,699 B1 | 1/2002 | Nielsen |
| 6,342,908 B1 | 1/2002 | Bates et al. |
| 6,353,398 B1 | 3/2002 | Amin et al. |
| 6,360,101 B1 | 3/2002 | Irvin |
| 6,374,289 B2 | 4/2002 | Delaney et al. |
| 6,400,810 B1 | 6/2002 | Skladman et al. |
| 6,425,127 B1 | 7/2002 | Bates et al. |
| 6,437,812 B1 | 8/2002 | Giles et al. |
| 6,438,618 B1 | 8/2002 | Lortz et al. |
| 6,456,307 B1 | 9/2002 | Bates et al. |
| 6,459,440 B1 * | 10/2002 | Monnes et al. .............. 715/808 |
| 6,459,913 B2 | 10/2002 | Cloutier |
| 6,463,462 B1 | 10/2002 | Smith et al. |
| 6,463,471 B1 | 10/2002 | Dreke et al. |
| 6,466,232 B1 | 10/2002 | Newell et al. |
| 6,480,207 B1 | 11/2002 | Bates et al. |
| 6,499,021 B1 | 12/2002 | Abu-Hakima |
| 6,513,026 B1 | 1/2003 | Horvitz et al. |
| 6,513,046 B1 | 1/2003 | Abbott, III et al. |
| 6,542,868 B1 | 4/2003 | Badt et al. |
| 6,549,219 B2 | 4/2003 | Selker |
| 6,549,915 B2 | 4/2003 | Abbott, III et al. |
| 6,563,514 B1 * | 5/2003 | Samar ........................ 715/711 |
| 6,577,329 B1 * | 6/2003 | Flickner et al. ............. 715/774 |
| 6,584,502 B1 | 6/2003 | Natarajan et al. |
| 6,590,587 B1 | 7/2003 | Wichelman et al. |
| 6,591,279 B1 | 7/2003 | Emens et al. |
| 6,593,943 B1 | 7/2003 | MacPhail |
| 6,618,716 B1 | 9/2003 | Horvitz |
| 6,622,160 B1 | 9/2003 | Horvitz |
| 6,650,902 B1 | 11/2003 | Richton |
| 6,672,506 B2 | 1/2004 | Swartz et al. |
| 6,674,720 B1 | 1/2004 | Passint et al. |
| 6,678,719 B1 | 1/2004 | Stimmel |
| 6,697,840 B1 | 2/2004 | Godefroid et al. |
| 6,714,967 B1 | 3/2004 | Horvitz |
| 6,741,188 B1 | 5/2004 | Miller et al. |
| 6,747,675 B1 | 6/2004 | Abbott et al. |
| 6,757,362 B1 | 6/2004 | Cooper et al. |
| D494,584 S | 8/2004 | Schlieffers et al. |
| 6,781,972 B1 | 8/2004 | Anderlind et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,829,639 B1 | 12/2004 | Lawson et al. |
| 6,837,436 B2 | 1/2005 | Swartz et al. |
| 6,842,877 B2 | 1/2005 | Robarts et al. |
| 6,853,634 B1 | 2/2005 | Davies et al. |
| 6,965,917 B1 | 11/2005 | Aloni et al. |
| 7,010,501 B1 | 3/2006 | Roslak et al. |
| 7,016,944 B1 | 3/2006 | Meyer et al. |
| 7,040,541 B2 | 5/2006 | Swartz et al. |
| 7,063,263 B2 | 6/2006 | Swartz et al. |
| 7,069,309 B1 | 6/2006 | Dodrill et al. |
| 7,073,129 B1 | 7/2006 | Robarts et al. |
| 7,139,718 B2 | 11/2006 | Jeyachandran et al. |
| 7,155,729 B1 * | 12/2006 | Andrew et al. ............... 719/318 |
| 7,162,238 B1 | 1/2007 | Massie et al. |
| 7,171,378 B2 | 1/2007 | Petrovich et al. |
| 7,195,157 B2 | 3/2007 | Swartz et al. |
| 7,209,955 B1 | 4/2007 | Major et al. |
| 7,385,501 B2 | 6/2008 | Miller et al. |
| 2001/0030664 A1 | 10/2001 | Shulman et al. |
| 2001/0030667 A1 | 10/2001 | Kelts |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0049275 A1 | 12/2001 | Pierry et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054117 A1 * | 5/2002 | van Dantzich et al. ...... 345/766 |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0087649 A1 | 7/2002 | Horvitz |
| 2002/0099817 A1 | 7/2002 | Abbott et al. |
| 2002/0171581 A1 | 11/2002 | Sheynblat et al. |
| 2002/0174199 A1 | 11/2002 | Horvitz |
| 2003/0028603 A1 | 2/2003 | Aktas et al. |
| 2003/0046351 A1 | 3/2003 | Maruyama et al. |
| 2003/0046401 A1 | 3/2003 | Abbott et al. |
| 2003/0046421 A1 | 3/2003 | Horvitz et al. |
| 2003/0154176 A1 | 8/2003 | Abbott, III et al. |
| 2004/0030753 A1 | 2/2004 | Horvitz |
| 2004/0061716 A1 | 4/2004 | Cheung et al. |
| 2004/0117443 A1 | 6/2004 | Barsness |
| 2004/0143636 A1 | 7/2004 | Horvitz et al. |
| 2004/0199663 A1 | 10/2004 | Horvitz et al. |
| 2004/0201500 A1 | 10/2004 | Miller et al. |
| 2004/0225718 A1 | 11/2004 | Heinzel et al. |
| 2005/0034078 A1 | 2/2005 | Abbott et al. |
| 2005/0050143 A1 | 3/2005 | Gusler et al. |

| | | | |
|---|---|---|---|
| 2005/0248437 | A1 | 11/2005 | Hellebust et al. |
| 2005/0266858 | A1 | 12/2005 | Miller et al. |
| 2005/0272442 | A1 | 12/2005 | Miller et al. |
| 2006/0019676 | A1 | 1/2006 | Miller et al. |
| 2007/0011314 | A1 | 1/2007 | Horvitz et al. |
| 2007/0214228 | A1 | 9/2007 | Horvitz et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |

FOREIGN PATENT DOCUMENTS

| | | |
|---|---|---|
| EP | 0413537 A2 | 2/1991 |
| EP | 0420779 | 4/1991 |
| EP | 0420779 A3 | 4/1991 |
| EP | 0867823 | 9/1998 |
| EP | 0867823 A2 | 9/1998 |
| EP | 095633 | 3/1999 |
| EP | 0905633 A2 | 3/1999 |
| EP | 0905633 A3 | 7/2000 |
| EP | 1022670 A2 | 7/2000 |
| GB | 2328110 A | 2/1999 |
| GB | 2353679 A | 2/2001 |
| JP | 06-230918 A | 8/1994 |
| JP | 08314827 | 11/1996 |
| JP | 08314827 A | 11/1996 |
| JP | 1079756 | 8/1998 |
| JP | 10079756 A | 8/1998 |
| WO | 9635994 | 11/1996 |
| WO | WO96/35994 | 11/1996 |
| WO | WO97/38382 | 10/1997 |
| WO | 9800787 | 1/1998 |
| WO | 9837680 | 8/1998 |
| WO | WO98/37680 | 8/1998 |
| WO | 9847268 | 10/1998 |
| WO | WO98/47268 | 10/1998 |
| WO | 9858321 | 12/1998 |
| WO | WO98/58321 | 12/1998 |
| WO | 9906915 | 2/1999 |
| WO | WO99/06915 | 2/1999 |
| WO | WO99/41720 | 8/1999 |
| WO | WO99/67731 | 12/1999 |
| WO | 0036493 | 6/2000 |
| WO | WO-0051040 A1 | 8/2000 |
| WO | WO-0101264 A1 | 1/2001 |
| WO | WO-0109753 A2 | 2/2001 |
| WO | WO-0158119 A2 | 8/2001 |
| WO | 0169387 | 9/2001 |
| WO | WO-0169532 A1 | 9/2001 |
| WO | 0239761 | 5/2002 |
| WO | 02065250 | 8/2002 |
| WO | 2004025912 | 3/2004 |

OTHER PUBLICATIONS

Costas Tsatsoulis, Qing Cheng and Hsin-Yen Wei, "Integrating Case-Based Reasoning and Decision Theory", 1997, 10 pages.

Francis Chu and Joseph Halpern, "A Decision-Theoretic Approach to Reliable Message Delivery", 15 pages.

Peter Haddawy, "An Overview of Some Recent Developments in Bayesian Problem-Solving Techniques Introduction to This Special Issue", 1999, 9 pages.

Finn V. Jensen, "Bayesian networks basics", Winter 1995/ Spring 1996, 14 pages.

Yu Lo Cyrus Chang, Leslie C. Lander, Horng-Shing Lu and Martin T. Wells, "Bayesian Analysis for Fault Location in Homogeneous Distributed Systems", 1993, 10 pages.

Sanguk Noh and Piotr J. Gmytrasiewicz, "Rational Communicative Behavior in Anti-Air Defense", 1998, 8 pages.

Alec Cameron and Hsiang-Lung Wu "Identifying and Localizing Electrical Components: A Case Study of Adaptive Goal-directed Sensing", 1997, 6 pages.

Nitin Sawhney and Chris Schmandt, Speaking and Listening on the Run: Design for Wearable Audio Computing, 1998, 8 pages.

Doree Duncan Sehgmann, Cati Laporte, and Stephan Vladimir Bugaj, "The message is the medium", 1997, 12 pages.

Juha Takkinen and Nahid Shahmehri, "CAFE: A Conceptual Model for Managing Information in Electronic Mail", 1998, 10 pages.

Jacob Palme, Jussi Karlgren, and Daniel Pargran, "Issues whe designing filters in messaging systems", 1996, 7 pages.

Chaomei Chen, "Visualising semantic spaces and author co-citation networks in digital libraries", 1999, 20 pages.

International Search Report dated Aug. 20, 2002, for International Application Serial No. PCT/US01/08711.

International Search Report dated Sep. 2, 2002, for International Application Serial No. PCT/US01/08710.

Robert M. Losee Jr., "Minimizing information overload: the ranking of electronic messages", 1989, 11 pages.

Paul E. Baclace, "Competitive Agents for Information Filtering", Dec. 1999, 1 page.

Makoto Iwayama and Takenobu Tokunaga, "Hierarchical Bayesian Clustering for Automatic Text Classification", 1995, 6 pages.

William W. Cohen, "Learning Rules that Classify E-Mail", 1996, 11 pages.

Gary Boone, Concept Features in Re: Agent, an Intelligent Email Agent, 1998, 8 pages.

Marti A. Hearst and Haym Hirsh, "Machine Learning in Information Access Papers from the 1996 AAAI Spring Symposium", 1996, 3 pages.

Jonathan Isaac Helfman and Charles Lee Isbell, "Ishmail: Immedieate Identification of Important Information", 8 pages.

M. Marx, et al, "Clues: Dynamic Personalized Message Filtering", Preceedings of the ACM 1996 Conference on Computer Supportedcooperative Work, Boston, Nov. 16-20, 1996, pp. 113-121.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38 - No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994. pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10 - No. 1.

Mark Weiser, Some Computer Science Issues in Ubiquitous Computing, Communications of the ACM, Jul. 1993, pp. 75-84, vol. 36 - No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on The Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, pp. 94-104, vol. 265—No. 3.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

M. Van Dantzich, D. Robbins, E. Horvitz, and M. Czerwinski. Scope: Providing Awareness of Multiple Notifications at a Glance. In Proceedings of AVI 2002, ACM Conference on Advanced Visual Interfaces, 2002. 11 pages.

D. Scott McCrickard and C.M. Chewar. Attuning Notification Design to User Goals and Attention Costs. Communications of the ACM, vol. 46 Issue 3, pp. 67-72, 2003.

Roel Vertegaal. Designing Attentive Interfaces. Proceedings of the Symposium on ETRA 2002: Eye tracking research and applications symposium, pp. 23-30, 2002.

Jeffrey S. Shell, Ted Selker, and Roel Vertegaal. Interacting with Groups of Computers. Communications of the ACM, vol. 46 Issue 3, pp. 40-46, 2003.

Eric Horvitz, et al. Models of Attention in Computing and Communication: From Principles to Applications, Communications of the ACM, 46(3): 52-29, Mar. 2003.

M. Sahami, et al. A Bayesian approach to filtering junk email, in Workshop on learning for text categorizations, 1998, 8 pages, AAI Technical Report WS-98-05, AAAI.

D. Koller, et al. Toward optimal feature selection, In proceedings of 13th conference on machine learning, 1998, pp. 284-292, Morgan Kaufmann, San Francisco.

E. Horvitz, et al. The Lumiere project: Bayesian user modeling for inferring the goals and needs of software users, in proceedings of the 14th conf on uncertainty in AI, 1998, pp. 256-265, Morgan Kaufmann, San Francisco.

J. Platt, Probabilistic outputs for support vector machines and comparisons to regularized likelihood methods, In Advances in Large Margin Classifiers, 1999, 11 pages, MIT Press, Cambridge, MA.

H. Leiberman, Letizia: An Agent that assists web browsing, in proceedings of IJCAI-95, 1995, 6 pages, Montreal Canada, Morgan Kaufmann, San Francisco.

Horvitz, et al. Display of Information for time-critical decision making, in Proceedings of the 11th Conf on uncertainty in AI, 1995, pp. 296-305, Monetrea, Canada.

M. Czerwinski, et al. Visualizing implicit queries for information management and retrieval, in proceedings of CHI'99, ACM SIGCHI Conf on informational and knowledge management, 1999, pp. 560-567, ACM.

S. Dumais, et al. Inductive learning algorithms and representations for text categorization, in proceedings of 7th Intl Conf on Information and Knowledge Management, 1998, pp. 148-155, ACM.

Platt, Fast training of support vector machines using sequential minimal optimization, in advances in kernel methods, support vector learning, 1999, pp. 41-65 MIT Press, Cambridge, MA.

Horvitz, Principles of mixed-initiative user interfaces, in proceedings of CHI'99, ACM SIGCHI Conf on Human Factors in Computing Systems, 1999, pp. 159-166, Pittsburgh, PA, ACM.

Breese, et al. Empirical analysis of predictive algorithms for collaborative filtering, in proceedings of the 14th conf on uncertainty in AI, 1998, pp. 43-52, AUAI, Morgan Kaufmann, San Francisco.

Horvitz, Time dependent utility and action under uncertainty, in proceedings of 7th conf on uncertainty in AI, LA, CA, 1991, pp. 151-158, Morgan Kaufmann, San Francisco.

Horvitz, Time-critical action: representations and application, in proceedings of the 13th conf on uncertainty in AI (UAI-97), 1997, pp. 250-257, Providence, RI, Morgan Kaufmann, San Francisco.

European Search Report dated Sep. 28, 2004 for Application No. EP 05 10 5299, 4 pages.

European Search Report dated Jul. 5, 2004, for Application No. EP 04 00 0621.

Nitin Sawhney, et al. Nomadic Radio: Speech and Audio Interaction for Contextual Messaging in Nomadic Environments, ACM Transactions on Computer-Human Interaction, ACM, Sep. 1, 2000, pp. 353-383.

Eric Horvitz, et al. Models for Attention in Computing and Communication: From Principles to Applications, Communications of the ACM, Mar. 2003, pp. 52-59, vol. 46, No. 3.

Sofus A. MacSkassy, et al., EmailValet: Learning Email Preferences for Wireless Platforms, Rutgers University, User Modeling 1999 Workshop—Machine Learning for User Modeling, Jun. 3, 1999, 4 pages.

Breese et al., "Empirical analysis of predictive algorithms for collaborative filtering", Proceedings of the 14th Conference on Uncertainty in AI, 1998 p. 43-52, AUAI, Morgan Kaufmann, San Francisco.

Czerwinski et al., "Visualizing implicit queries for information management and retrieval", Proceedings of CHI'99, ACM SIGCHI Conf on Informational and Knowledge Management, 1999, p. 560-567.

Dumais et al.,"Inductive learning algorithms and representations for text categorization", Proceedings of 7th Intl Conf on Information and Knowledge Management, 1998, pp. 148-155.

EP Search Report dated Jun. 20, 2005 for EP 02025530.

Horvitz et al., "Display of Information for time-critical decision making" Proceedings of the 11th Conference on uncertainty in AI, 1995, p. 296-305, Montreal, Canada.

Horvitz et al., "The Lumiere project: Bayesian user modeling for inferring the goals and needs of software users", Proceedings of the 14th conference on uncertainty in AI, 1998, p. 256-265, Morgan Kaufmann, San Francisco.

Horvitz, "Principles of mixed-initiative user interfaces" Proceedings of CHI'99, ACM SIGCHI Conf on Human Factors in Computing Systems, 1999, pp. 159-166, Pittsburgh, PA.

Horvitz, "Time dependant utility and action under uncertainty", Proceedings of the 7th Conference on Uncertainty in AI, LA, CA, 1991 pp. 151-158, Morgan Kaufmann, San Francisco.

Horvitz, "Time-critical action:Representations and Application", Proceedings of the 13th Conference on Uncertainty in AI(UAI-97), 1997, pp. 250-257, Providence, RI, Morgan Kaufmann, San Francisco.

International Search Report dated Jun. 28, 2006 for International Application Serial No. PCT/US04/19915.

Kalakota et al., "Mobile Agents and Mobile Workers", Proceedings of the European Conference on Machine Learning, Apr. 21, 1998, pp. 137-142, Germany.

Koller et al., "Toward optimal feature selection", Proceedings of 13th conference on machine lerning, 1998, p. 284-293, Morgan Kaufmann, San Francisco.

Kozierok et al., "A Learning Interface Agent for Scheduled Meetings", Feb. 2003, pp. 81-93.

Lashkari et al., "Collaborative Interface Agents", Proceedings AAAI, National Conference on Artificial Intelligence, Jul. 21, 1994, vol. 1, pp. 444-449.

Lee et al., "Learning and Predicting User Behavior for Particular Resource Use", Proceedings of the Florida Artifical Intelligence Research Symposium, May 21, 2001, pp. 177-181.

Leiberman, "Letizia: An Agent that assists web browsing", Proceedings of IJCAI-95, 1995, 6 pgs, Montreal, Canada, Morgan Kaufmann, San Francisco.

Loke et al., "Location-Based Personal Agents: A Metaphor for Situated Computing", Parallel Processing, 2000 Internation Workshops, Aug. 21, 000, pp. 17-19.

Partial European Search Report dated Mar. 17, 2005 for EP Application No. 02025530, 3 pages.

Platt, "Fast Training of Support Vector Machines Using Sequential Minimal Optimization", Advances in Kernel Methods, Support Vector Learning, 1999 p. 41-65, MIT Press, Cambridge, MA.

Sahami et al., "A Bayesian approach to filtering junk email" Workshop on learning for text categorizations, 1998, 8 pgs, AAI technical Report WS-98-05, AAAI.

* cited by examiner

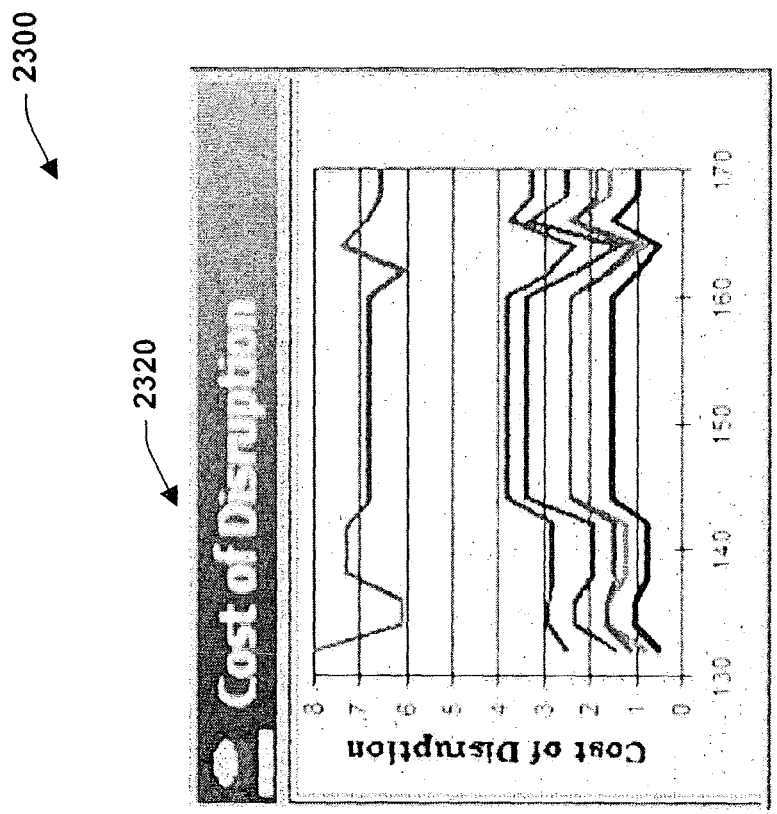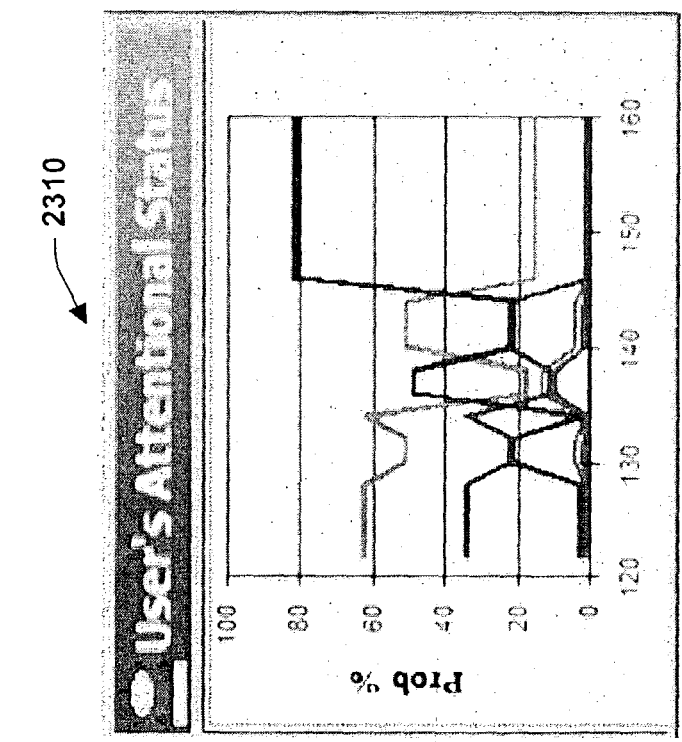
FIG. 23

FIG. 24

POSITIONING AND RENDERING NOTIFICATION HERALDS BASED ON USER'S FOCUS OF ATTENTION AND ACTIVITY

REFERENCE TO RELATED APPLICATIONS

This application is a continuation in part of U.S. patent application Ser. No. 10/220,550 filed on Aug. 30, 2002, entitled PRIORITIES GENERATION AND MANAGEMENT, which claims priority to PCT Application Serial No. PCT/US01/08710, filed on Mar. 16, 2001, which claims the benefit of U.S. Provisional Patent Application Ser. No. 60/189,801, filed on Mar. 16, 2000, entitled ATTENTIONAL SYSTEMS AND INTERFACES.

This application is also a continuation in part of U.S. patent application Ser. No. 10/220,419 filed on Aug. 30, 2002 now U.S. Pat. No. 7,243,130, entitled NOTIFICATION PLATFORM ARCHITECTURE, which claims priority to PCT Application Serial No. PCT/US01/08711, filed on Mar. 16, 2001, which claims the benefit of U.S. Provisional Patent Application Ser. No. 60/189,801, filed on Mar. 16, 2000, entitled ATTENTIONAL SYSTEMS AND INTERFACES. All of the aforementioned applications are incorporated herein by reference.

TECHNICAL FIELD

The present invention relates generally to systems and methods that facilitate communications between devices, systems, processes, and/or individuals. More particularly, the present invention relates to dynamically rendering information for users based upon their focus of attention, cognitive load, and activity.

BACKGROUND OF THE INVENTION

As computer systems have evolved, users of such systems have had to adapt to rapidly changing technological innovations. This is apparent when considering all the different forms of desktop applications for managing information. Users can literally choose from thousands of different software options for merely utilizing applications on their desktop computers. Often users have at their disposal multiple computers and displays for interfacing to such applications as well. Modern applications range from word processors, spreadsheets, web browsers, calendar systems, email applications, CAD systems and so forth. With the ever increasing numbers of applications however users are finding it difficult to not only properly deploy respective applications but also to manage the enormous amounts of information generated therefrom.

In just one example concerning information management, users as they are working, often are bombarded with dozens of electronic interruptions per day. This can be quite demanding given that most users are quite busy trying to process a given task at hand. These interruptions can be generated from a plurality of sources such as email, scheduling notifications (e.g., generated from electronic calendaring systems), instant message notifications, electronic reminders, voice messages, as well as managing individual notices that may arise when dealing with any given application (e.g., messages that popup while running an application such as automated help or troubleshooting advice). With such disruptions, users are continually challenged to balance the given task at hand with trying to process all the information that may become available during the day.

The computer science and artificial intelligence community consider many aspects relating to how to assist users in a variety of ways with advice and support about tasks and status. In many aspects, these sciences attempt to implement computer innovations that make it easier for users to process information or alternatively to enable computers to more effectively assist users when performing computer-related tasks. Respective innovations from these disciplines however often lead to more applications that are useful in their own right, yet leave the user with an overall greater task of processing increasing amounts information from the various applications.

The challenges of handling information updates and alerts are exacerbated by the growing use of larger display surfaces and multiple display configurations. Users may be directing their attention to different regions and may find it costly to search, find, and potentially interact with graphical renderings of visual "heralds" that provide notification about messages of importance, and potentially also provide access, via one or more user gestures (such as clicking on a region of the displayed herald), to more details about messages or allow the invocation of particular viewers or other applications via gestures, and then return to the region they had been attending to continue to review or interact with other displayed items (e.g., returning to a primary word processing task displayed at a different location on the current screen or another screen). Users may also miss important notifications that are displayed in regions that are not being attended to.

Thus, explicit systems, processes, and designs need to be developed that consider the importance of information to be reviewed by users, and the ease and efficacy at which users will be able to see or have access to the information, while at the same time minimizing information overload and distractions for application users.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for rendering information to users based on their focus of attention and current activities. With the advent of broadening use of notification applications such as email, for example, and the growing importance of subscription-centric notification services, it is of increasing importance to provide users with tools and designs that allow users to have access to awareness of potentially important notifications at minimal cognitive load, and minimal overall disruption. Also, with the increasing size of displays and the growing use of multiple monitors, simple default placement of incoming information at a "main location" may be missed. Thus, the present invention provides attention-sensitive placement and configuration of visual heralds providing notification information, based on a user's determined activity (or other available inputs about focus of visual attention) such as via gaze and pose information.

Visual heralds are dynamically rendered in accordance with the present invention and can be associated with a prioritized messaging system that assigns an urgency value to incoming messages. Such messages can be summarized and dynamically placed in a user's workspace such as a desktop display to control how information is presented to the user and in a manner designed to minimize distraction for the user. An information controller is provided that receives feedback or input from one or more models describing the user's focus of attention and cognitive load, for example, wherein one or more dynamic controls guide various aspects of the visual herald in order to direct how and when the information is presented to the user. Such controls include dynamic positioning of the herald, dynamic sizing controls, dynamic rendering controls such as controlling shapes, colors and dimensions of the herald, dynamic audio controls, dynamic appearance controls (e.g., fading in/fading out) and/or other controls such as timing of how long information is presented to the user. By considering such factors as the user's current focus of attention, and dynamically directing information to the user that minimizes distraction based on the current focus, the present invention facilitates a user's ability to cognitively process information in an efficient manner (e.g., if incoming message is high urgency and user is determined to be not exceedingly busy on some other task based upon a predetermined threshold, move display herald to user's current focus of attention, otherwise slowly fade-out over time).

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 23 is a diagram illustrating inferences about attentional states and expected cost of interruption over time in accordance with an aspect of the present invention.

FIG. 24 is a diagram illustrating alerting displays in accordance with an aspect of the present invention.

DETAILED DESCRIPTION OF THE INVENTION

The present invention relates to a system and method to facilitate efficient and automated processing of electronic notifications by users. A notification system includes an information herald or display object that presents summarized notifications to the users. An information controller receives attentional inputs associated with a respective user to dynamically generate or render the information herald on a display screen or screens in order to facilitate user processing of the summarized notifications. The attentional inputs can be derived from systems such as gaze or head-pose tracking devices wherein such systems can be analyzed by models in order to determine the user's current focus of attention and/or cognitive load. Depending on the attention/load, the information herald can employ a plurality of dynamic adjustments to facilitate presentation and timing of information to the user. Also, a messaging system such as a prioritization system or notification system, for example, operates in conjunction with the information controller in order to prioritize messages and thus further control operations therein.

As used in this application, the terms "component," "model," "controller," "herald," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques for executing rule-based, logical policies, or methods employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
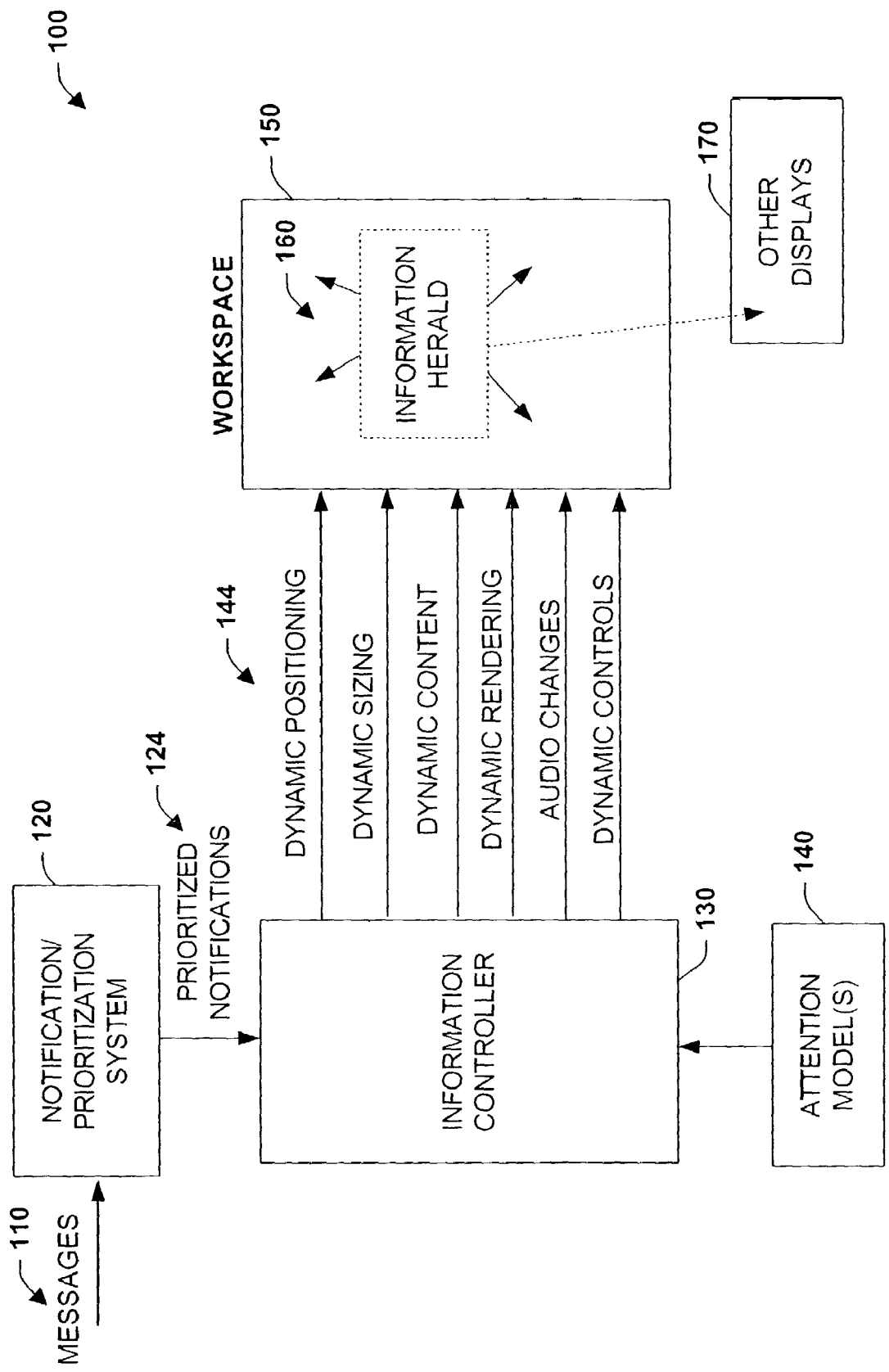
FIG. 1 is a schematic block diagram illustrating information processing system in accordance with an aspect of the present invention.

Referring initially to FIG. 1, a system 100 illustrates information processing in accordance with an aspect of the present invention. One or more messages 110 are processed by a notification and/or prioritization system 120 wherein one or more prioritized notifications 124 (or non-prioritized) are generated and subsequently processed by an information controller 130. The information controller 130 receives inputs regarding user activities such as from one or more attention models 140 and generates one or more dynamic outputs 144 to provide/control information to users at a workspace 150. An information herald 160 that operates at various locations in the workspace 150 receives dynamically adjustable data from the information controller 130 in order to provide notifications to users in a non-distractive and unobtrusive manner. It is noted that the information controller 130 can control positioning and content of the information herald 160 within the workspace/display 150 and/or provide similar controls and positioning within one or more other workspaces/displays illustrated at 170.

The system 100 provides attention-sensitive placement and configuration of the information herald 160, based on a user's activity such as via the attention models 140 and/or other available inputs about focus of visual attention such as gaze and pose information described below. In general, the system 100 provides various notification display processes to enable a user to review at the high level, summaries of decisions about how much to attend to incoming messages 110 (e.g., whether to drill down to access the messages in more detail). Various components such as the information controller 130 also, provide an elegant mechanism for automatically "getting the information herald 160 out of the way," (e.g., via a fading away or timing out of the herald after some time of being displayed without user hover or drill down operations). Such timing out after a wait period, allows users to continue to work as they would be working with or without a glance at the herald—allowing users to send an implicit signal that they are not interested by information presented in the herald 160, i.e., without requiring an explicit user action.

It is noted that the herald 160 can be adapted as a selectable portal to getting more details, e.g., for email, the herald can include just the sender, recipients, subject title and an initial line of an email, but clicking on the message brings up the details at the same location, or jogged slightly away from the current work region.

The user controls 144 can include a plurality of controls for driving/directing the information herald 160 to the user. These can include dynamic positioning controls for controlling coordinate locations of the herald (in the workspace 160 and/or other displays 170), dynamic sizing controls for changing the size of the herald, dynamic content controls for changing the information appearing within or associated with the herald (e.g., on large messages providing summary info, on smaller messages displaying whole message), dynamic rendering controls for changing the appearance of the herald or content therein (e.g., colors, shapes, fonts, dimensions 2D to 3D, and so forth), changing audio cues as described below, and/or providing other dynamic controls such as controlling timing of information display and fading the herald in and out.

Other aspects of the invention include providing an entry point into the controls for decisions about the policies for the rendering of heralds 160, and the positioning and rendering of the heralds inside respective heralds, (e.g., a particular region or button at the right lower, right-hand side of the herald) that allows entry into controls for adjustment in general or for the case at hand (e.g., notice that the user has been typing in the top window, and also working in a Word application, and having available as a state when controls are invoked).

As an example, the heralds 160 can be displayed and controlled by specifying the following user options about the influence of contextual considerations in the position-sensitive rendering of heralds about important information:

When
[ ] All Times
[ ] When I am in any desktop Application
[x] Only when I using Microsoft Word
[ ] When I've been typing More generally, these options can be made available to users to select at any time, via a rich control panel for specifying preferences about heralds, (e.g., with regard to the attention-sensitive positioning). Also, an option can be added that when the herald 160 is accessed and its information is displayed, and if the information or configuration of information is complex, then other open windows or structures associated with the current or other tasks can be moved to the side, or collapsed and minimized in a particular iconic structure or other symbolic representation. When the information from the herald is closed, then the task is restored to what it was like before the herald was accessed (e.g., task jogged back to the position it was in, or "re-hydrated" back up to full size and position it was in). Other controls include herald or general gestures or control that lets a user say, "no, not now" to the herald 160. That is, instead of just going away, the herald can be told to come back again soon when user has a bit more time or has finished something. This can also be coupled with a "snooze" feature, allowing user to say, "later" or "in 5 minutes, please" (come up again in 5 minutes, not now).

In another aspect, the display of information and items associated with hovering or clicking on the herald 160 can be a complex structure which can be provided with one or more "handles" on the structure for closing it all at once. That is, the herald 160 can be analogized to the case of accessing a single email message when clicking on the herald about an important email, and then seeing a single email message, and then closing it. A complex set of windows for other graphical items can also be brought up as part of the structure, and users may be given a way of "closing the whole thing" after some interaction (e.g., via interacting with a selection graphic to close entire structure).

Based upon message urgency for example, the herald can change positions in the appropriate location. For example, the herald position for important information is displayed in the lower right-hand corner of the active window, the window that contains the content that is currently (or was just recently) being worked on active, but if the time for activity has passed and some threshold time has been reached, the item is displayed in the center of the last active monitor, if more time passes, the herald is displayed at a default location (lower right hand side of left most display), and/or if more time passes, user is assumed to be away and the herald is logged via a mechanism that will display important unseen heralds to the user in a particular location when they are sensed as "arriving back" at a system.

Other herald aspects include alerting functions such as a "while you were away, you missed these notices" function. For heralds that would have been displayed if the user was around, when the user returns after time away (e.g., after some time of no activity on system, or in more sophisticated systems, after not being seen to have gazed at the system, or no office activity detected (e.g., acoustical), then, is seen to be back with gaze or other presence, or moves a mouse and breaks a screen saver, etc.), user is displayed with a list of heralds of missed information in some location (e.g., in default spot, where mouse is now, in active initial window, etc.) These options can be coupled with a timing out of importance of heralds, e.g., only the messages from the last 1 hour are showed explicitly, others are clustered into closed links (e.g., labeled "Older than 1 hr"). Sound localization methods, such as stereo acoustical renderings can cognitively localize the audio associated with a herald in a position at or near the location of the physical rendering of the herald.

Attention-sensitive heralds can also appear in lower, right-hand side of an active window (or other locations) and then inch up along the right hand edge of a window toward the middle of the window linearly (or some other function) with the increasing importance of the message. This can also be designed as inching up toward the level of the current or most recent (within time horizon) mouse cursor location (for active mouse). Also, ancillary information (e.g., an email message) can be displayed automatically for very important (without a click or gesture) or automatically after a time if a user doesn't actively click or say, "no" or "not now" etc.

It is to be appreciated that the present invention can employ substantially any coordinate system, including multidimensional coordinate systems, and employ substantially any display format for the information herald 160, wherein the display format can include substantially any shape, color, dimension, code format—including embedded executables, and include combinations of these and other respective formats or attributes. In addition, information retrieved from a message 110 can be directed to substantially any portion of the workspace 150 and/or 170 regardless of any apparent display orderings depicted in the system 100. It is noted that display content can be transformed as it is placed on the workspace 150 and/or 170. For example, the content or information herald 160 could be scaled in a smaller manner such as generating an iconic representation of the content.

The information herald can be provided as part of the graphical user interface in association with the information controller 130 and can be provided as part of and/or in association with the display 150 or 170. The display 150, 170 and/or information herald 160 can be configured via interfaces regarding various aspects of display or content preferences, configurations and/or desired information formatting by the user. The display 150, 170 and/or information herald 160 can include display objects (e.g., icons, buttons, sliders, input boxes, selection options, menus, tabs, and so forth) having multiple dimensions, shapes, colors, text, data and sounds to facilitate optimal control, sizing/resizing, format and/or display of the herald. This can include such aspects as dimensioning the herald, providing feedback regarding displayed content or models, and controlling herald updates. In addition, various menus and alternative screens or display outputs can be provided that perform a plurality of aspects of the present invention. These aspects can also include a plurality of inputs for adjusting and configuring one or more aspects of the present invention. This can include receiving user commands from a mouse, keyboard, speech input and/or other device to effect operations of the display 150, 170 via an associated graphical user interface.

Figure 2:
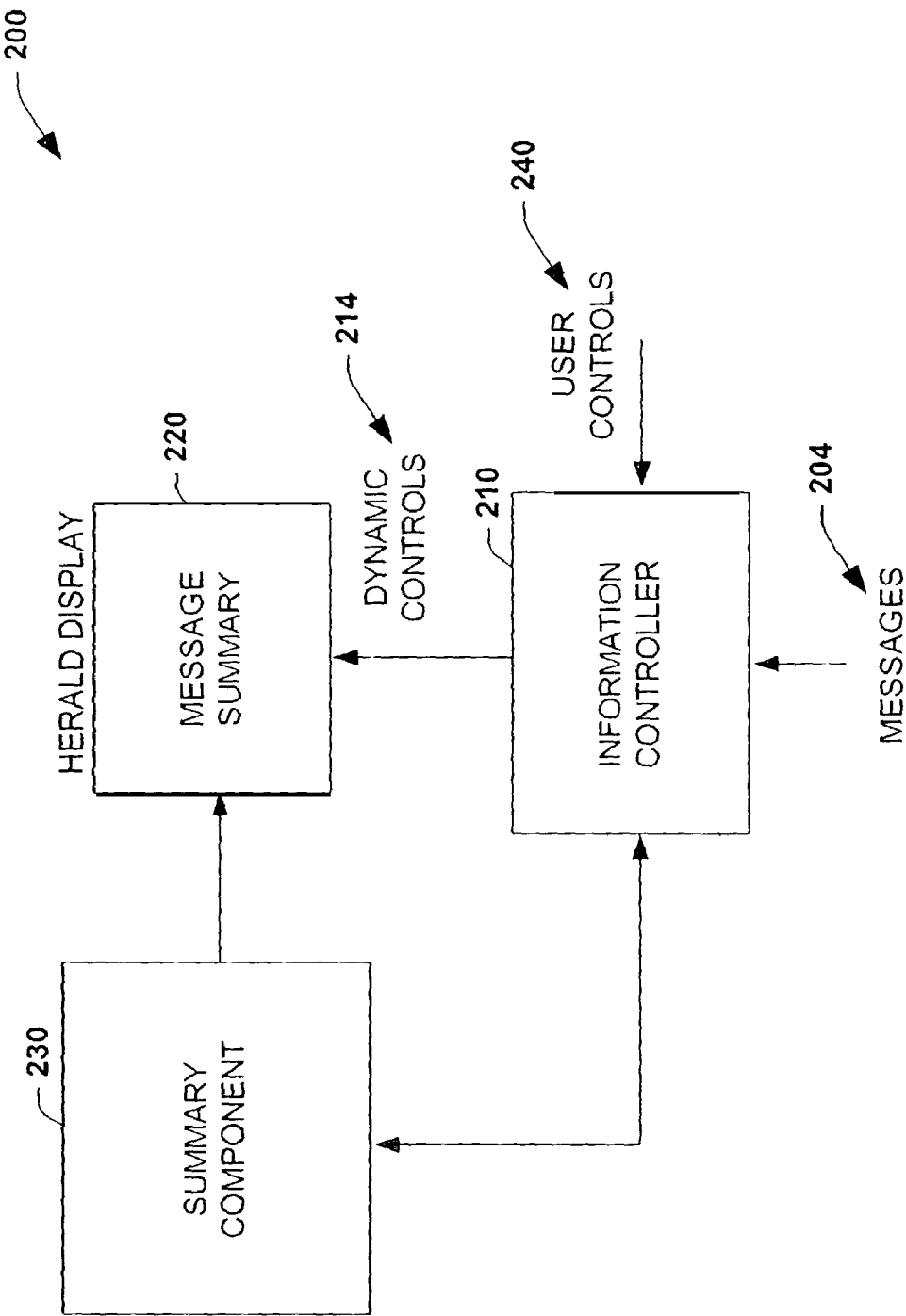
FIG. 2 is a diagram illustrating an exemplary herald display in accordance with an aspect of the present invention.

Referring now to FIG. 2, a system 200 illustrates an example of herald display processing in accordance with an aspect of the present invention. In this aspect, various messages 204 are processed by an information controller 210 that includes one or more controls 214 for controlling display and presentation of information within a herald display 220. A summary component 230 is provided to summarize information associated with the messages 204 (e.g., display RE: line of message, display message chunks, display message outline). As noted above, the present invention provides for dynamically positioning, within a computer desktop environment, visual summaries of incoming notifications 204 at the herald display 220, such that they are conveniently located near a user's focus of attention. These visual heralds 220 can be set to fade in (with alpha blending) in one aspect and remain for some period of time before fading away. If a user hovers a cursor over the visual herald 220, the fading is paused, for inspection, for example. If the user clicks on the visual herald (or other signal such as voice), the full incoming message can be invoked.

Figure 3:
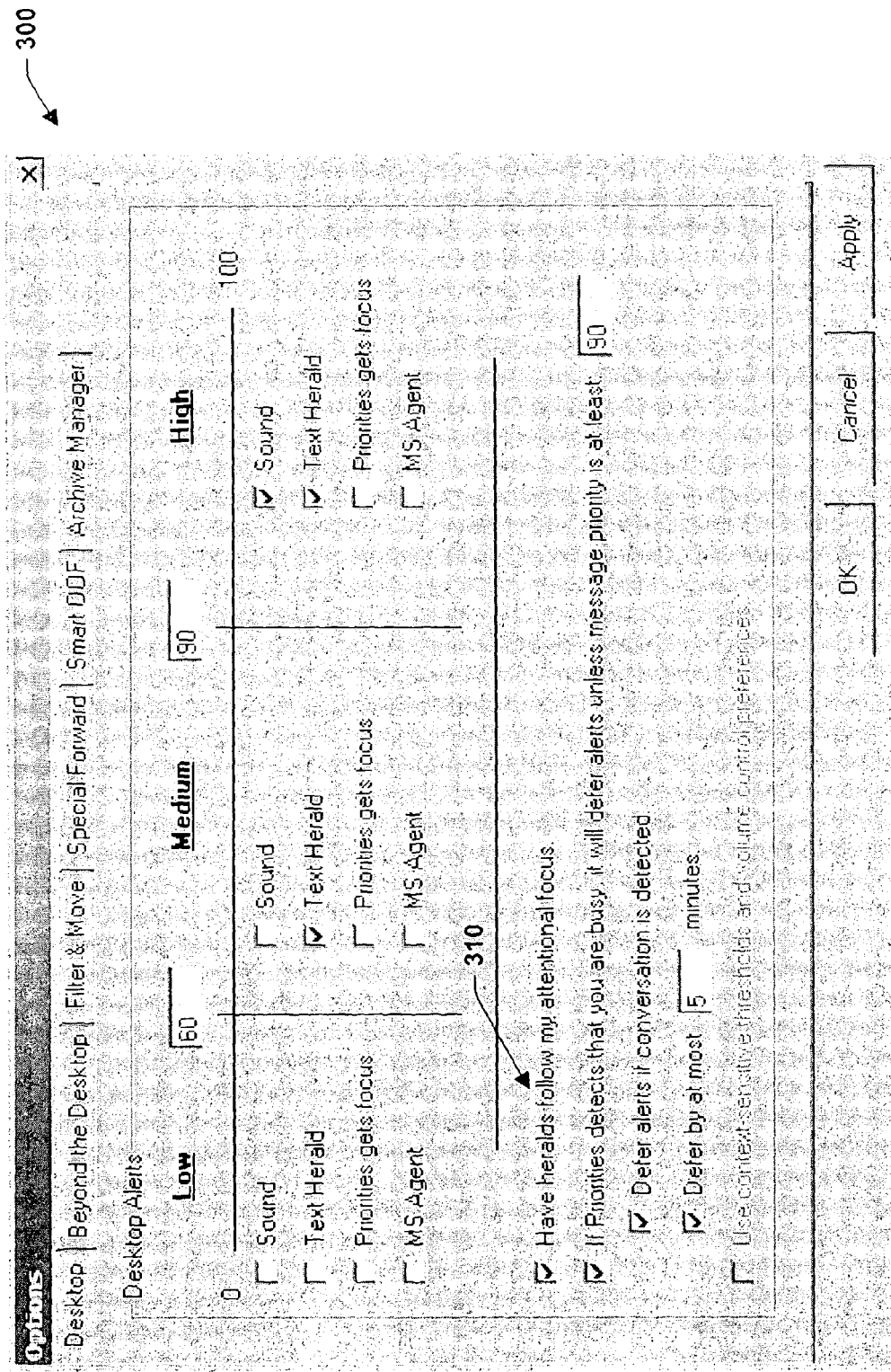
FIG. 3 illustrates an example user interface in accordance with an aspect of the present invention.

In a basic approach, a visual herald appears in a particular location (e.g., the lower right-hand screen of the right most monitor) when a message with a particular property, e.g., exceeding a preset threshold, arrives. Beyond basic control, the system 200 allows the user to indicate, in a control panel, that the system should employ an "Attention-Sensitive Herald." via user controls 240. This feature is illustrated in a user interface 300 of FIG. 3, at reference numeral 310. In this configuration, the system senses if a user has been working in an application window within an "active time horizon," and if the user is currently active in the window (e.g., mousing and keyboarding with an application in focus) or has been active within that horizon, incoming visual heralds are positioned in a predefined or pre-set position within the window, (e.g., the lower, right-hand corner). If the user has been inactive for a period of time that falls outside of the horizon, the visual herald appears in the default, top-level location, (e.g., lower right-hand side of the rightmost monitor).

Figure 4:
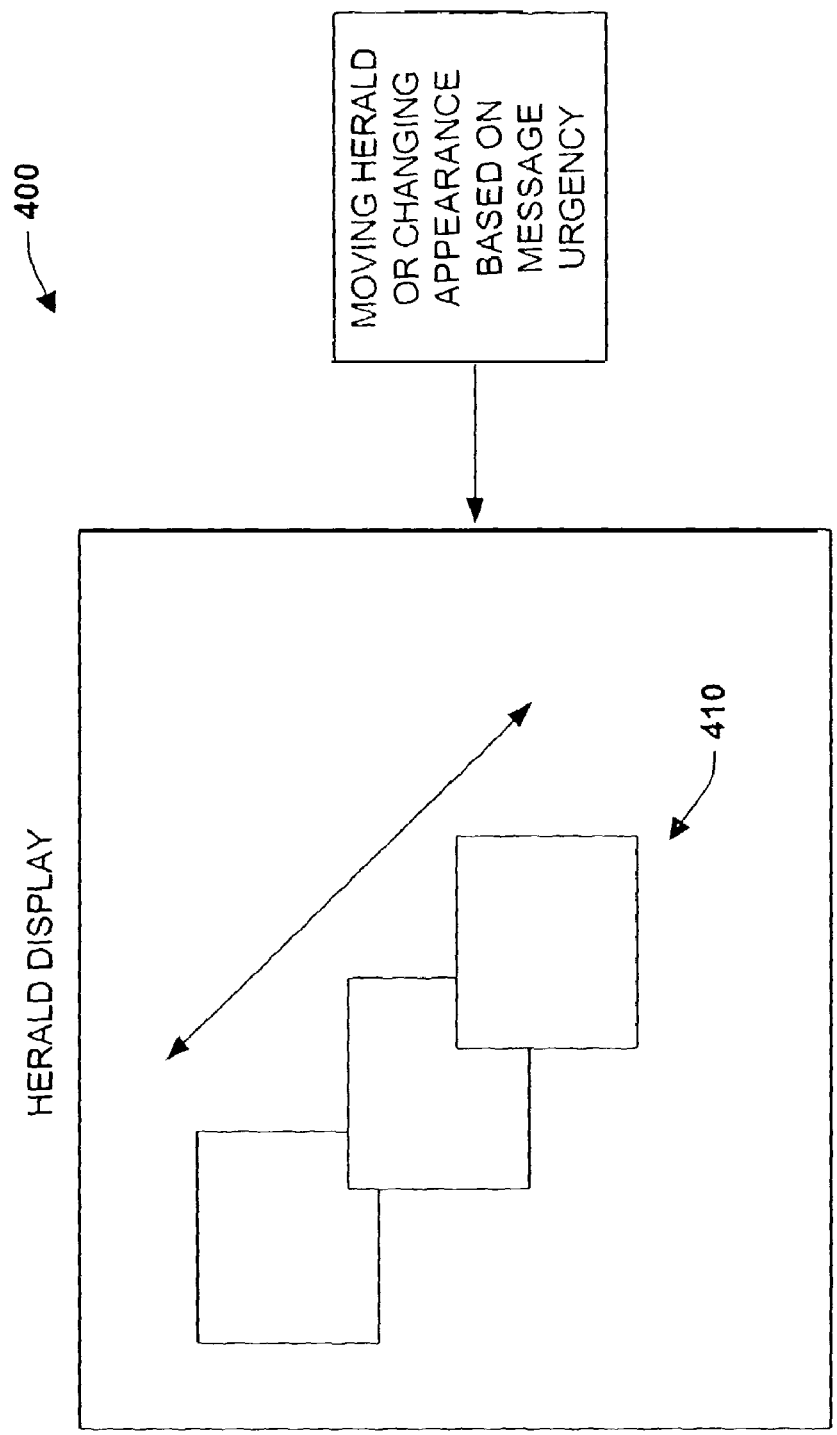
FIG. 4 illustrates alternative presentation options in accordance with an aspect of the present invention.

Referring now to FIG. 4, a system 400 illustrates alternative presentation options in accordance with an aspect of the present invention. In this aspect, a visual herald 410 dynamically is moved from the periphery of a display 420, (e.g., from a default location in the periphery, increasingly closer to the user's focus of attention with increasing urgency of the message, whereby such urgency can be described by a prioritization system described below. These options can be typically controlled via a configuration panel that allows users to express their preferences (e.g., keep all messages below medium priority on the periphery, otherwise move higher priority notifications to my focus of attention).

Figure 5:
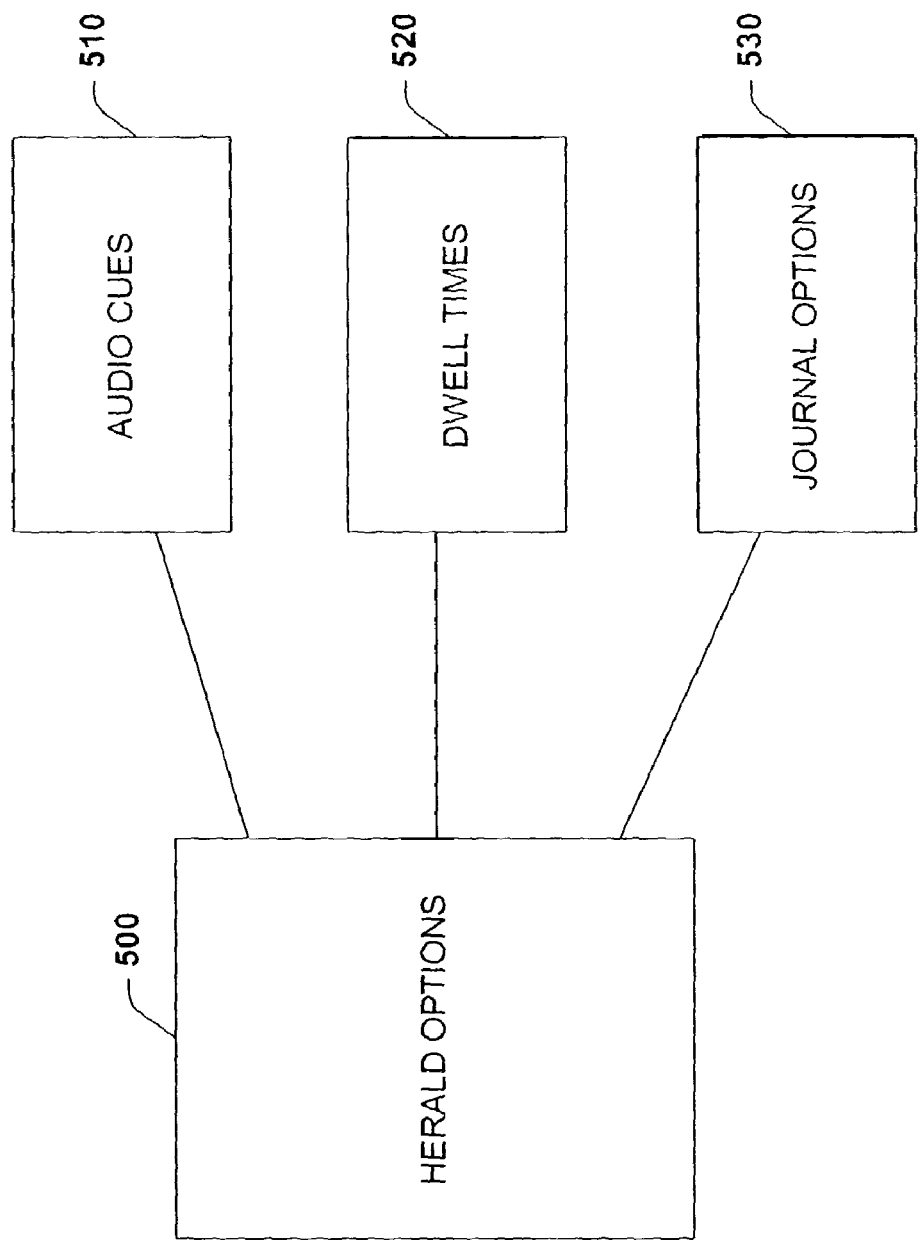
FIG. 5 is a diagram illustrating herald options in accordance with an aspect of the present invention.

FIG. 5 illustrates one or more other herald options 500 in accordance with an aspect of the present invention. At 510, the systems and components described above can be configured to selectively include an audio herald along with the visual display, using auditory cues that represent the urgency of an incoming message. In another aspect, the system only uses a cue, or adds a cue when no one is there—only for visual heralds that are placed in a top-level default region, as these are the ones that are apt to be missed if no audio alerting is included.

At 520, dwell time of the herald can be shortened or lengthened depending on where the herald is being displayed and/or the user's workload. For example, it may be valuable to extend the time that a herald is displayed when it is being displayed in a default location, potentially far from where the user is working—especially in multiple-monitor situations. If the user is busy, it may be useful to hold up the message for a longer period of time to give the user a chance to review and then make a decision, if the user is interested, to further drill down on the message. At 530, any visual herald that is allowed to fade away without more detailed inspection can be appended to a herald journal or folder that allows a user to inspect the herald later in an efficient manner. The entries of such a journal can be given a lifespan and/or a maximum size, if desired. Such an inspect-able, expandable journal can reduce the need to rush to access the information in a herald if a user happens to be busy.

Figure 6:
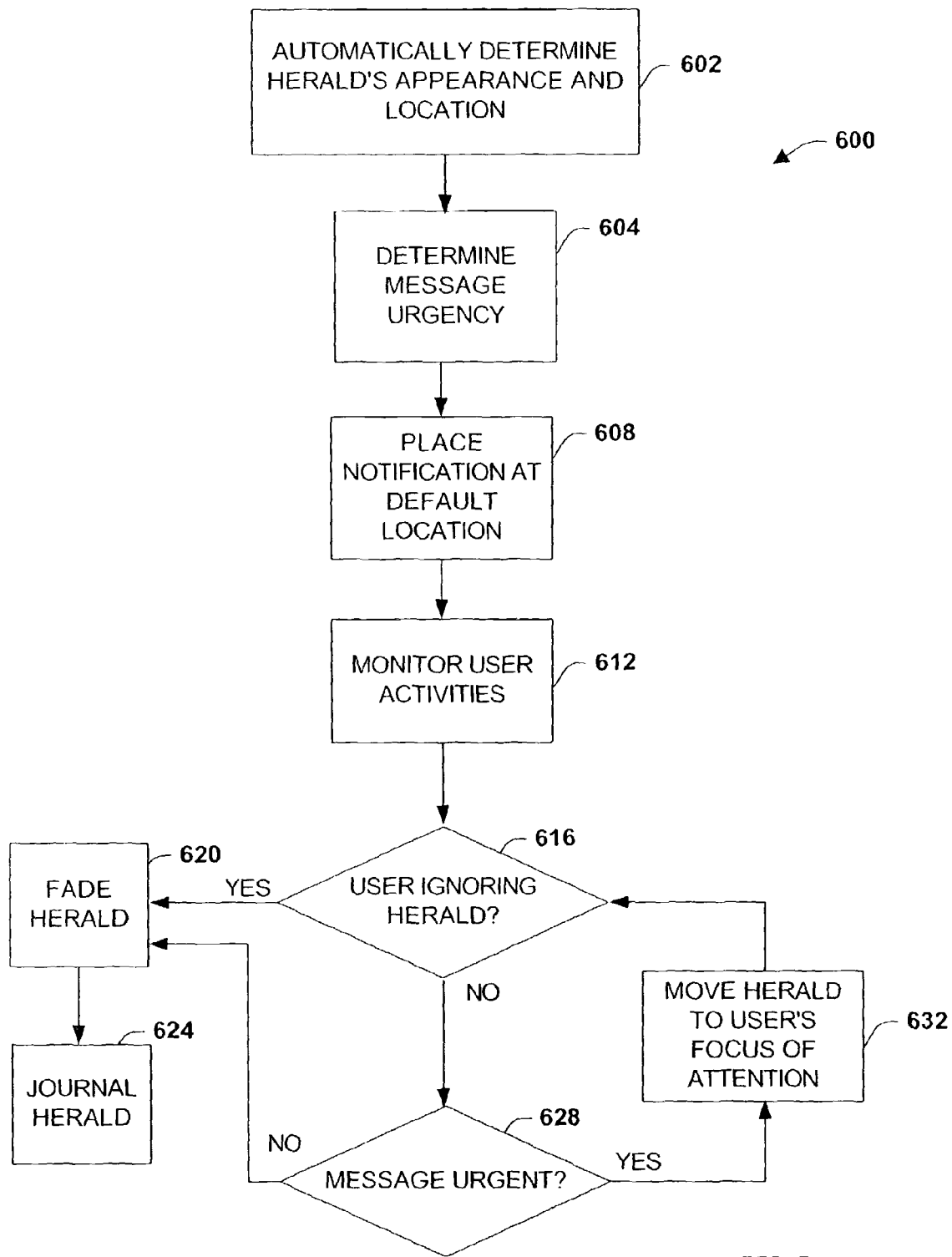
FIG. 6 is a flow diagram illustrating notification herald processing in accordance with an aspect of the present invention.

FIG. 6 illustrates a methodology for notification herald processing in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 602, a notification herald's appearance and location are automatically determined. As noted above, this can include summarizing a notification and placing it within a small display having substantially any form or shape. At 604, message urgency is automatically determined. As described below, one or more classifiers may be employed to automatically assign an urgency value for a message. At 608, the notification herald is automatically placed in a default location within the user's workspace or workspaces. Controls can be provided to enable users to set respective default locations. At 612, user activities are monitored. As noted above, this can include defining attention models that describe/determine the user's focus of attention or other activity.

Figure 7:
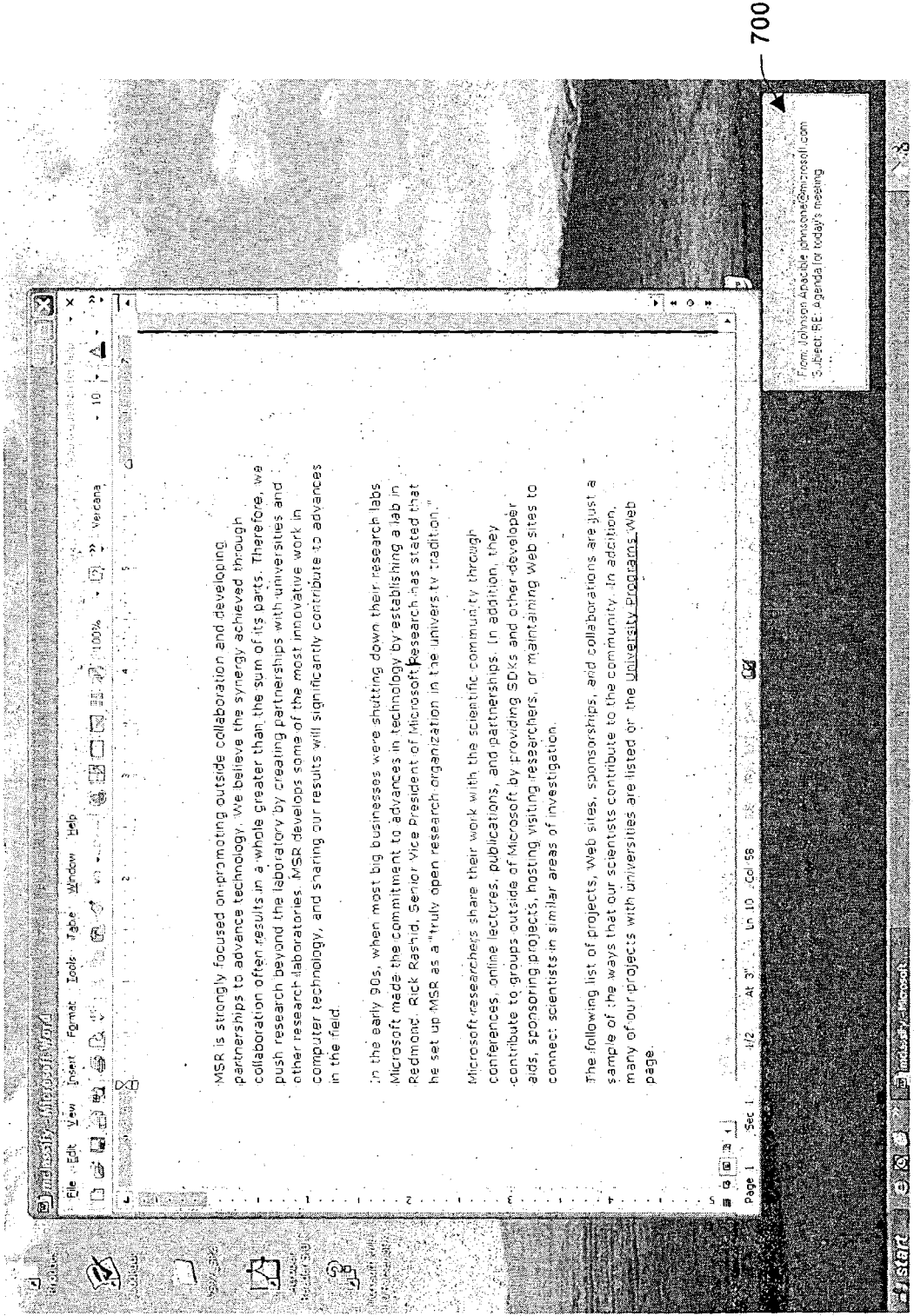
FIGS. 7-9 illustrate an exemplary workspace, notification herald, and notification herald movement in accordance with an aspect of the present invention.
Figure 8:
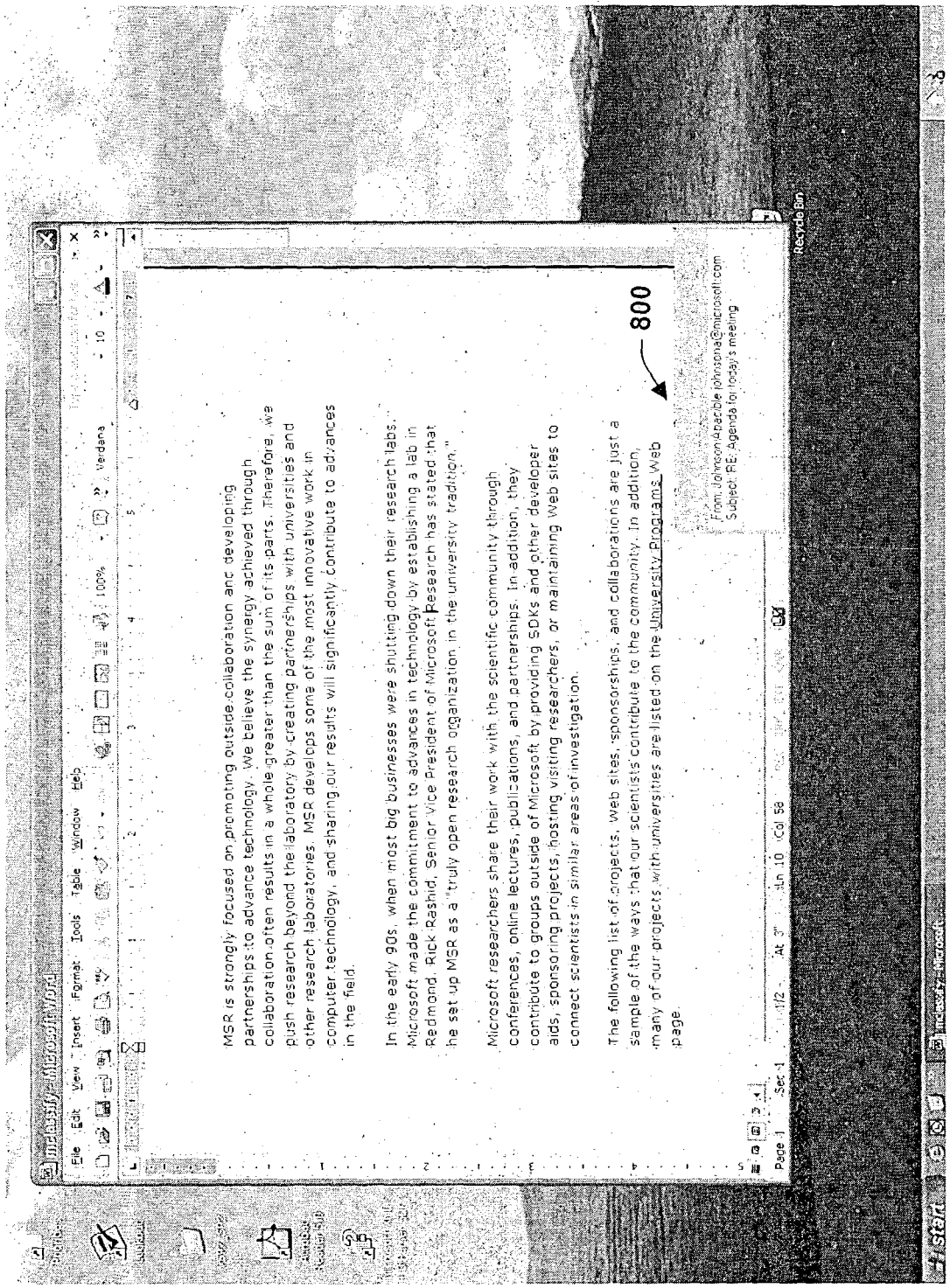

At 616, a determination is made regarding whether or not the user is ignoring the herald placed at 608. If so, the process proceeds to 620 whereby the herald can be slowly faded over time and dynamically placed into a journal, if desired at 624. If the user is not ignoring the herald at 616, another determination is made regarding message urgency at 628. If a notification is determined to be urgent, the process proceeds to 632 in order to dynamically move the herald closer to the user's focus of attention before proceeding back to 616. If the message is not determined particularly urgent (as defined by a predetermined threshold), the process proceeds back to 620, wherein the herald can be faded and/or placed into a journal at 624. FIGS. 7 and 8 illustrate an exemplary workspace, notification herald, and notification herald movement in accordance with an aspect of the present invention. In FIG. 7, a notification herald 700 is illustrated in a default location in an example user workspace. Proceeding to FIG. 8, a notification herald 800 (same info as herald 700) is depicted as having been dynamically moved closer to the user's focus of attention. As noted above, this type of movement can be automatically initiated via differing levels of urgency that can be associated with a given notification.

Figure 9:
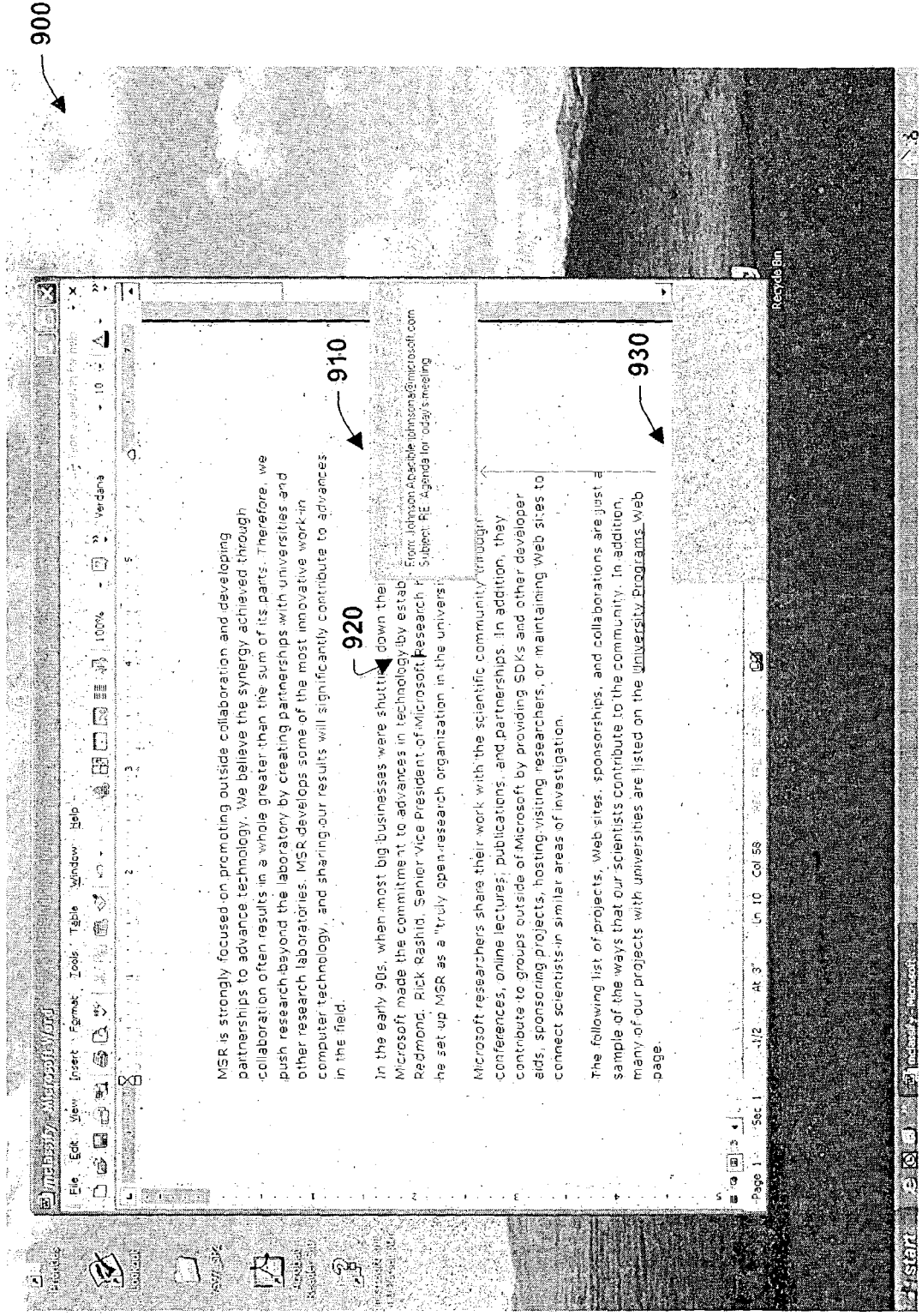
Figure 10:
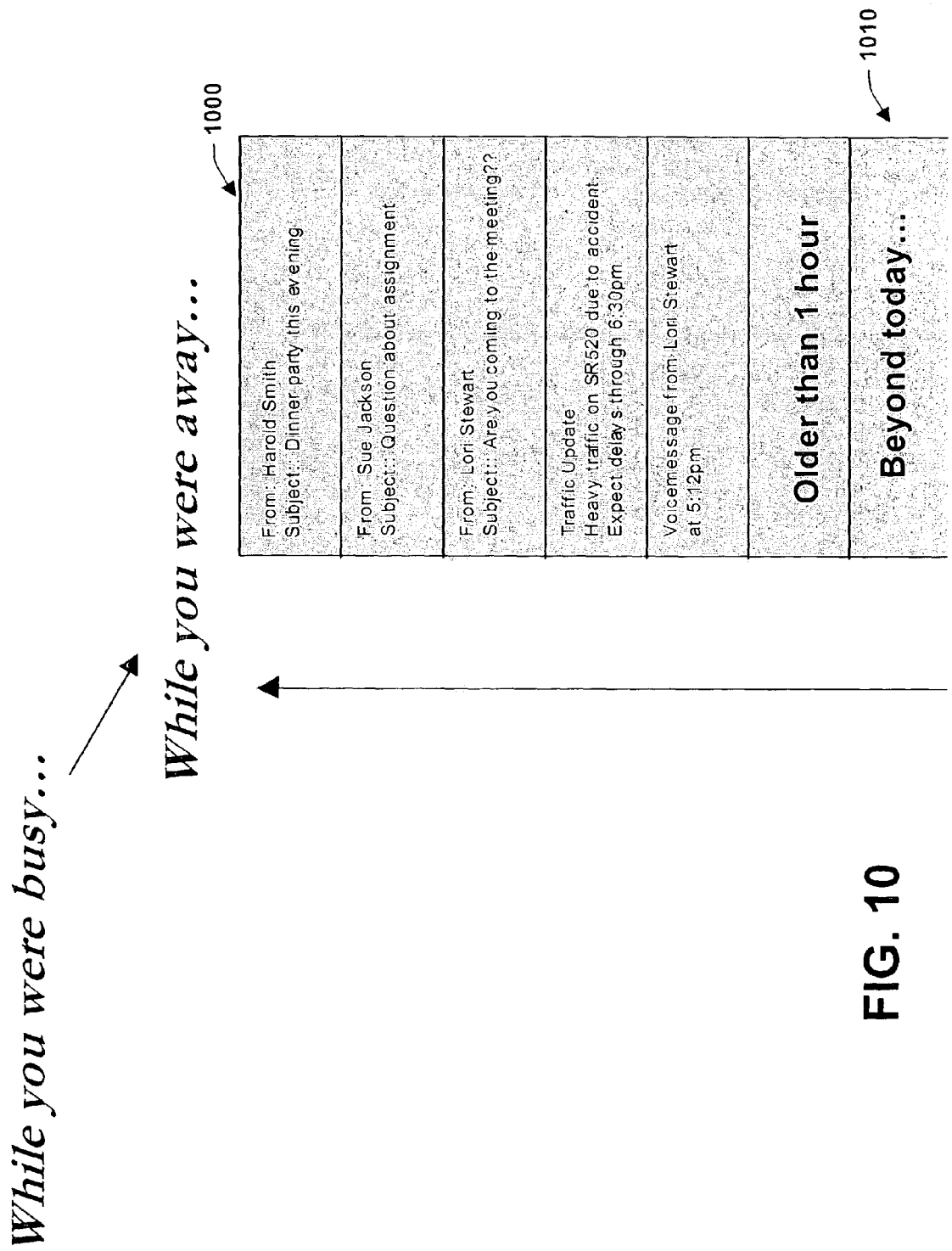
FIGS. 10-18 illustrate herald actions and movements in accordance with an aspect of the present invention.

FIG. 9 Figure illustrates that a herald 910 can be made to come closer to current cursor position at 920 (but not obfuscating things) with urgency in one aspect. Also, the present invention can interpolate between the position at 910 and other lower positions at 930, for example (e.g., linearly with urgency above some threshold value). The particular solution of moving the herald from the lower right-hand corner at 930 up to the middle of an active window, or up to the place an active cursor is, can be based on message urgency or importance over a display threshold, where the location can be mapped smoothly or in a step-function manner to the urgency or importance.

FIGS. 10-18 illustrate a sequential depiction of example herald actions and movements in accordance with an aspect of the present invention. At FIG. 10, herald messages are placed into a folder at 1000 in ascending order from oldest to newest messages (could be reversed) for messages that have exceeded a predetermined time threshold relating to while a user was busy or away. For example, these herald messages can be stored in a folder such as older than one hour or other criterion for later review of items that may have been missed. Another criterion is illustrated at 1010 depicting a folder for messages that are older than 1 day.

Figure 11:
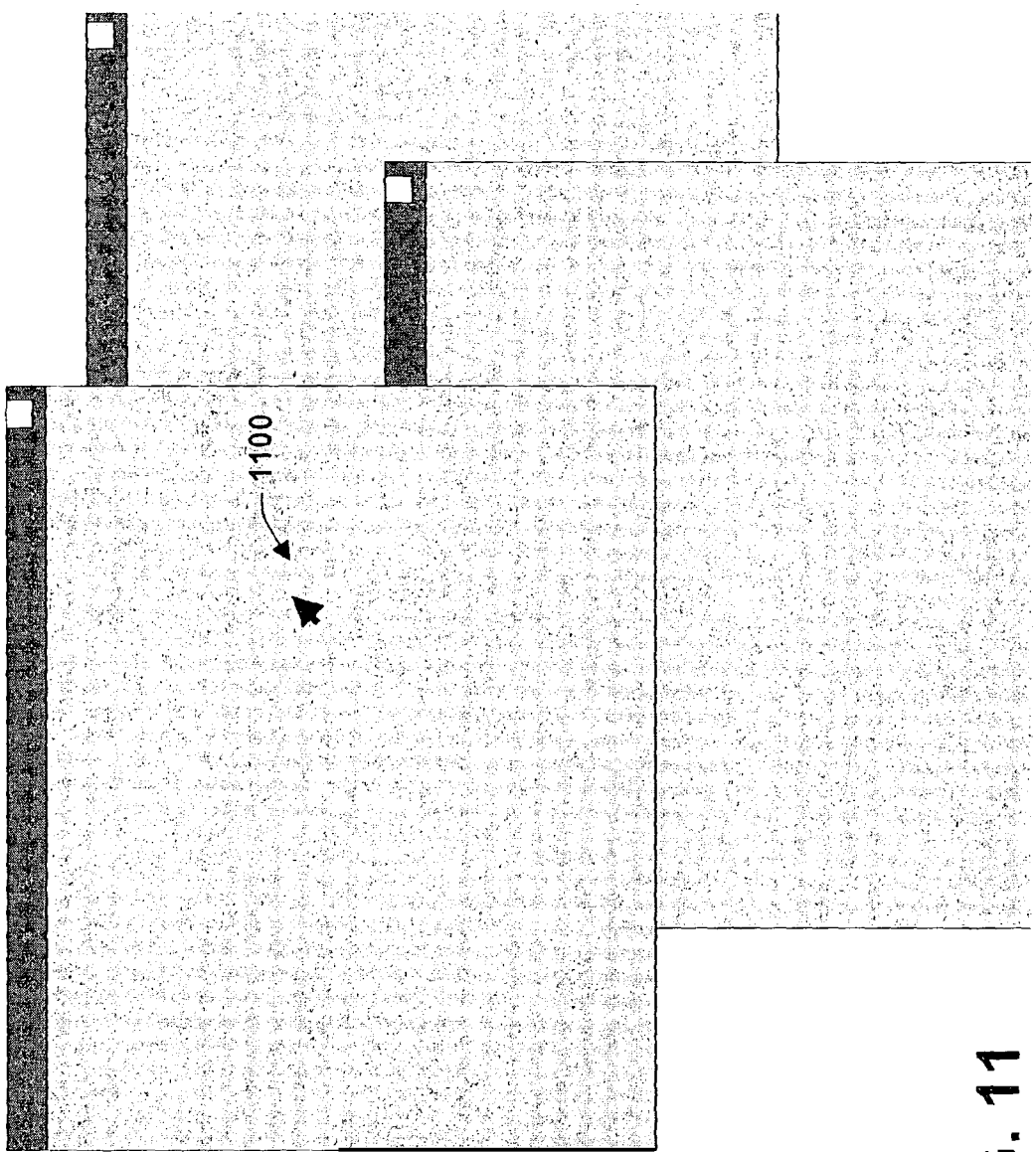
Figure 12:
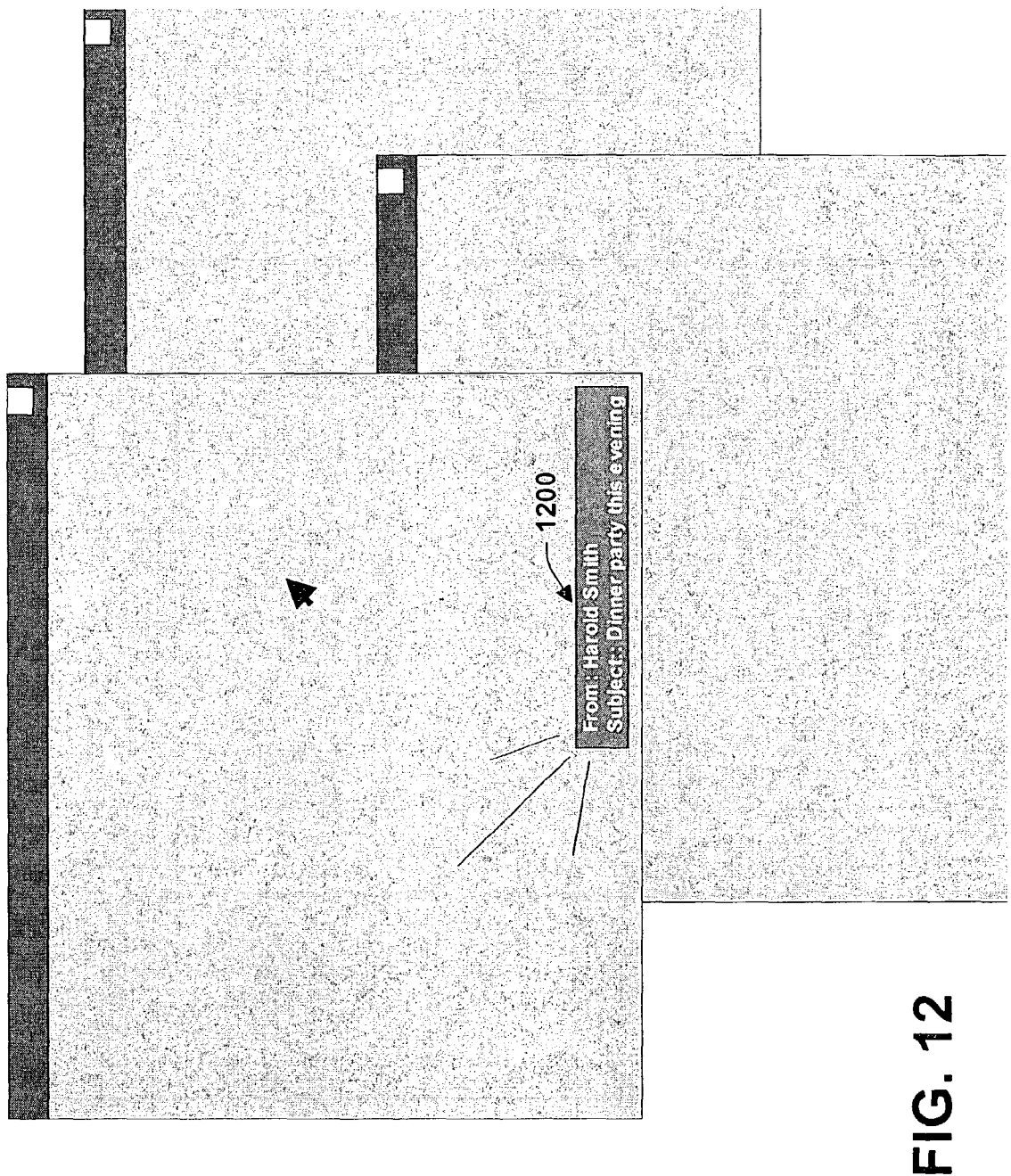
Figure 13:
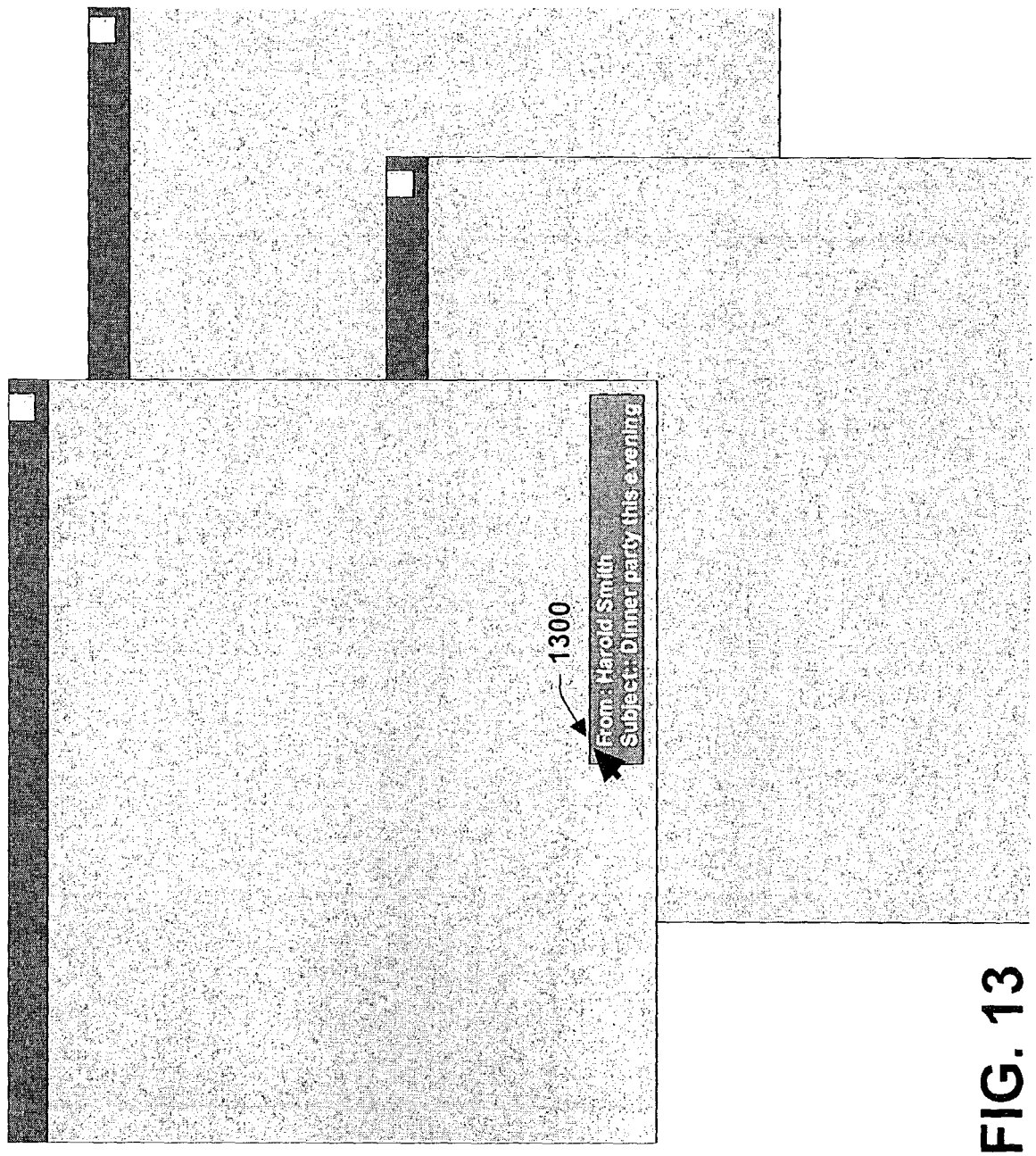
Figure 14:
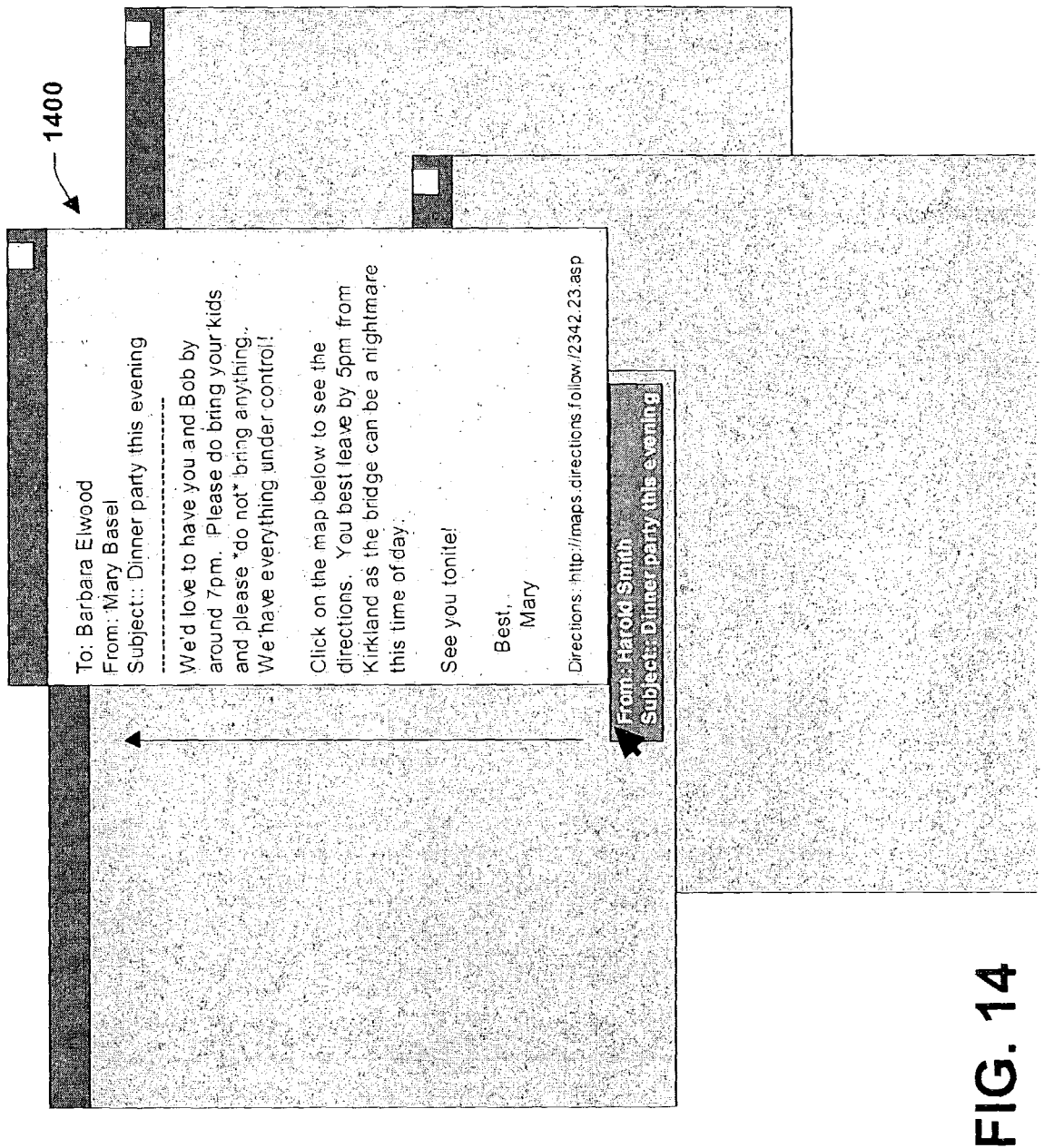
Figure 15:
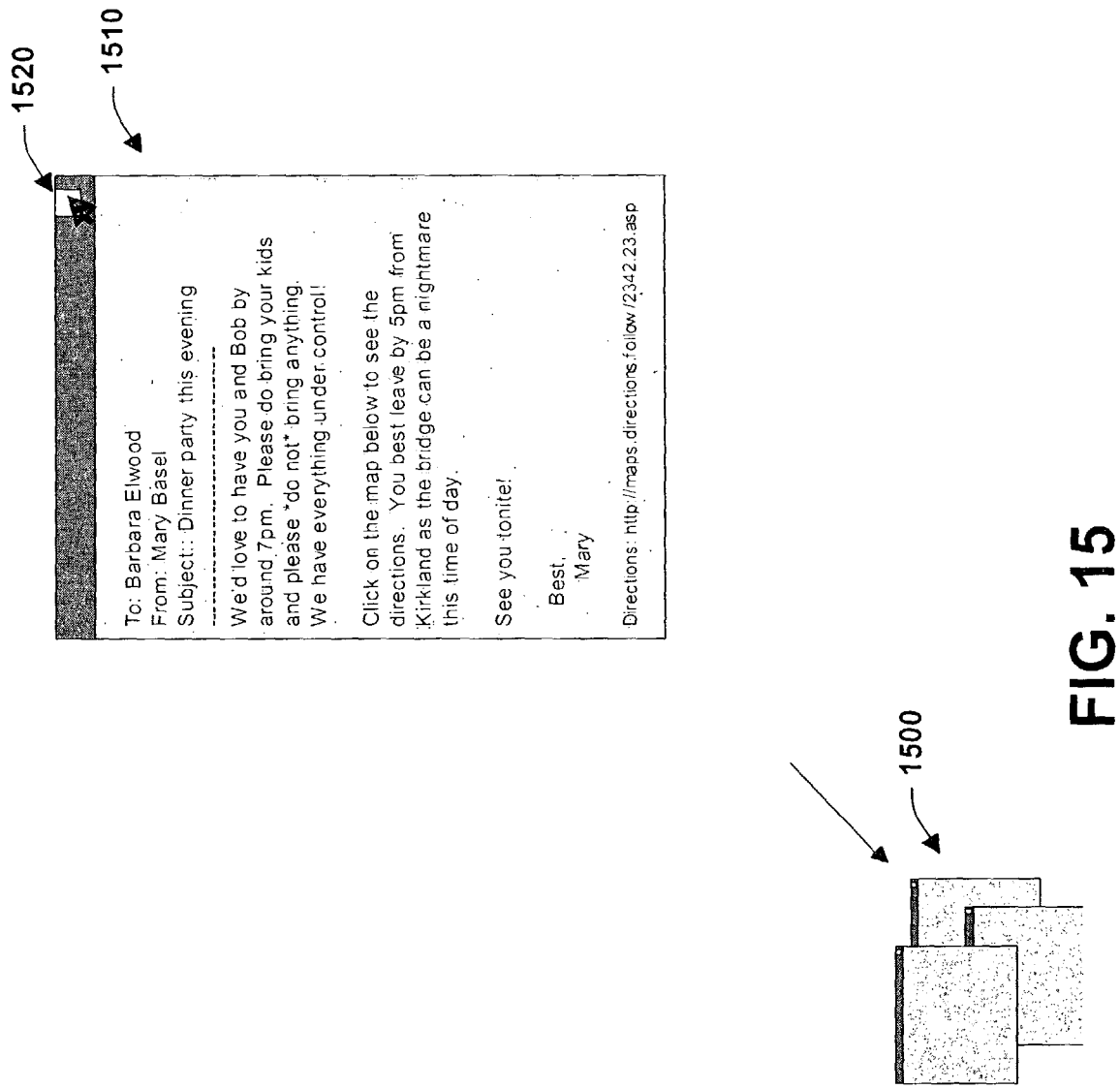
Figure 16:
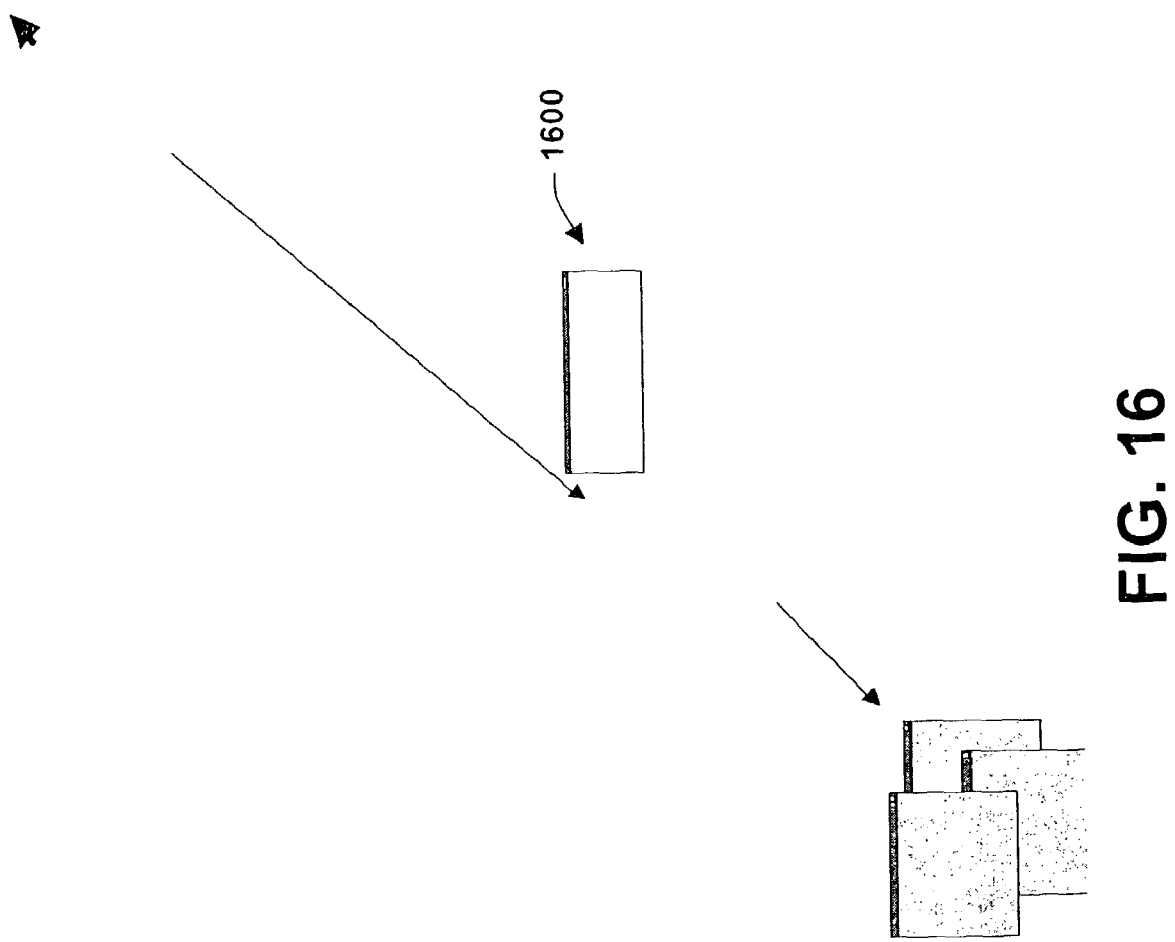
Figure 17:
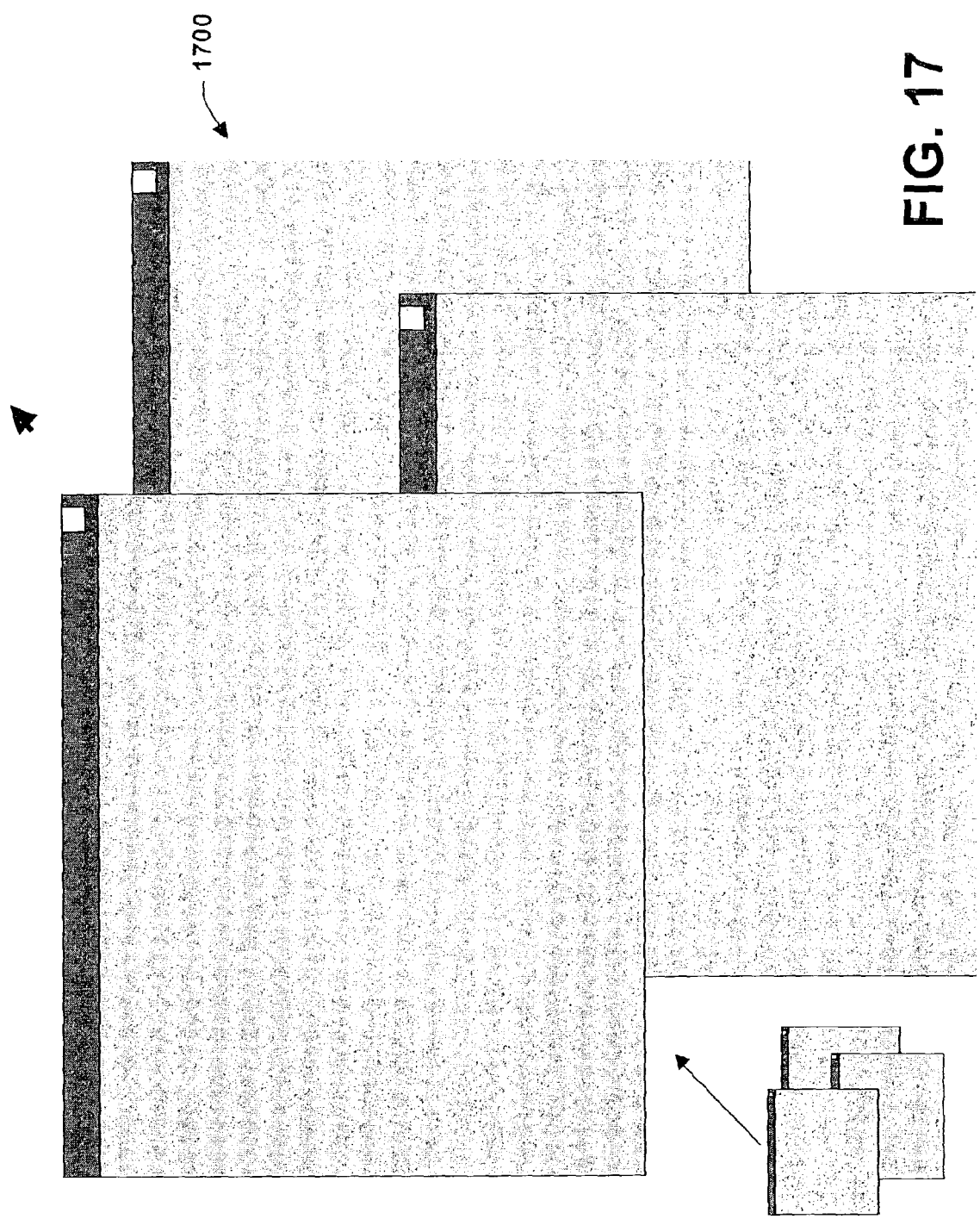
Figure 18:
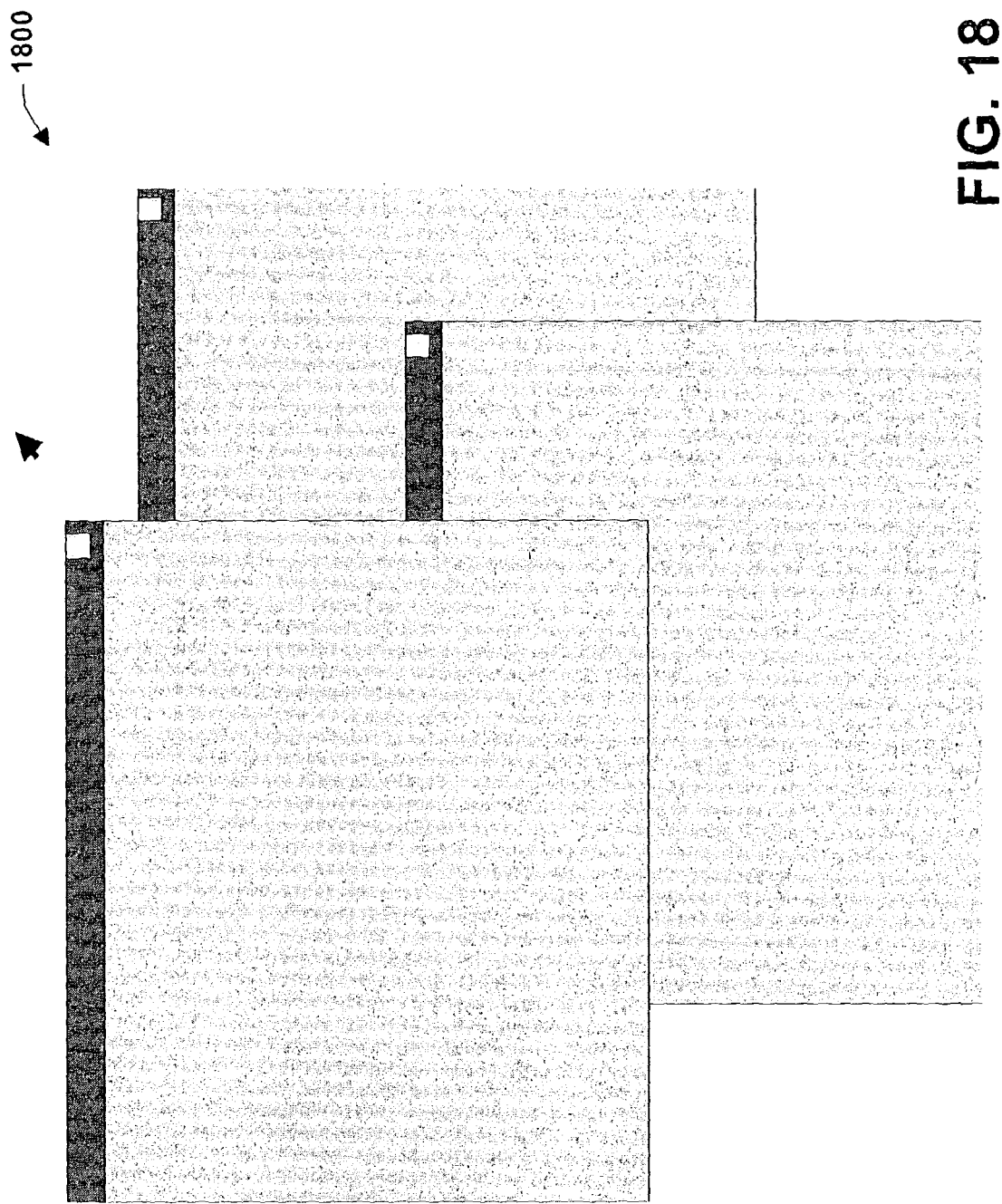

FIGS. 11-18 illustrate how a herald can come into the focus of attention in a desktop setting having one or more applications active therein. For example, FIG. 11 depicts three active windows open on a desktop, wherein a cursor 1100 is active on an application in focus or at top. FIG. 12 depicts a herald that has been automatically directed to a lower portion of the top application at 1200. FIG. 13 illustrates a user's cursor movement to inspect the herald at 1300. FIG. 14 illustrates a pop-up window 1400 that displays details of the herald based upon the user selecting or hovering over the herald previously selected in FIG. 13. FIG. 15 shows the current desktop applications being minimized at 1500 while the user is examining the herald information at 1510. It is noted that this action can be controlled via user preference settings (e.g., select setting that calls for application minimization during herald inspection). After inspection of the herald, the user can remove or minimize the herald via selection at 1520, wherein FIG. 16 illustrates the minimization or removal of the herald at 1600. FIG. 17 illustrates the automatic return of the previous applications at 1700, wherein FIG. 18 illustrates the user's previous desktop environment before receiving and inspecting the herald in FIGS. 13-15.

Figure 19:
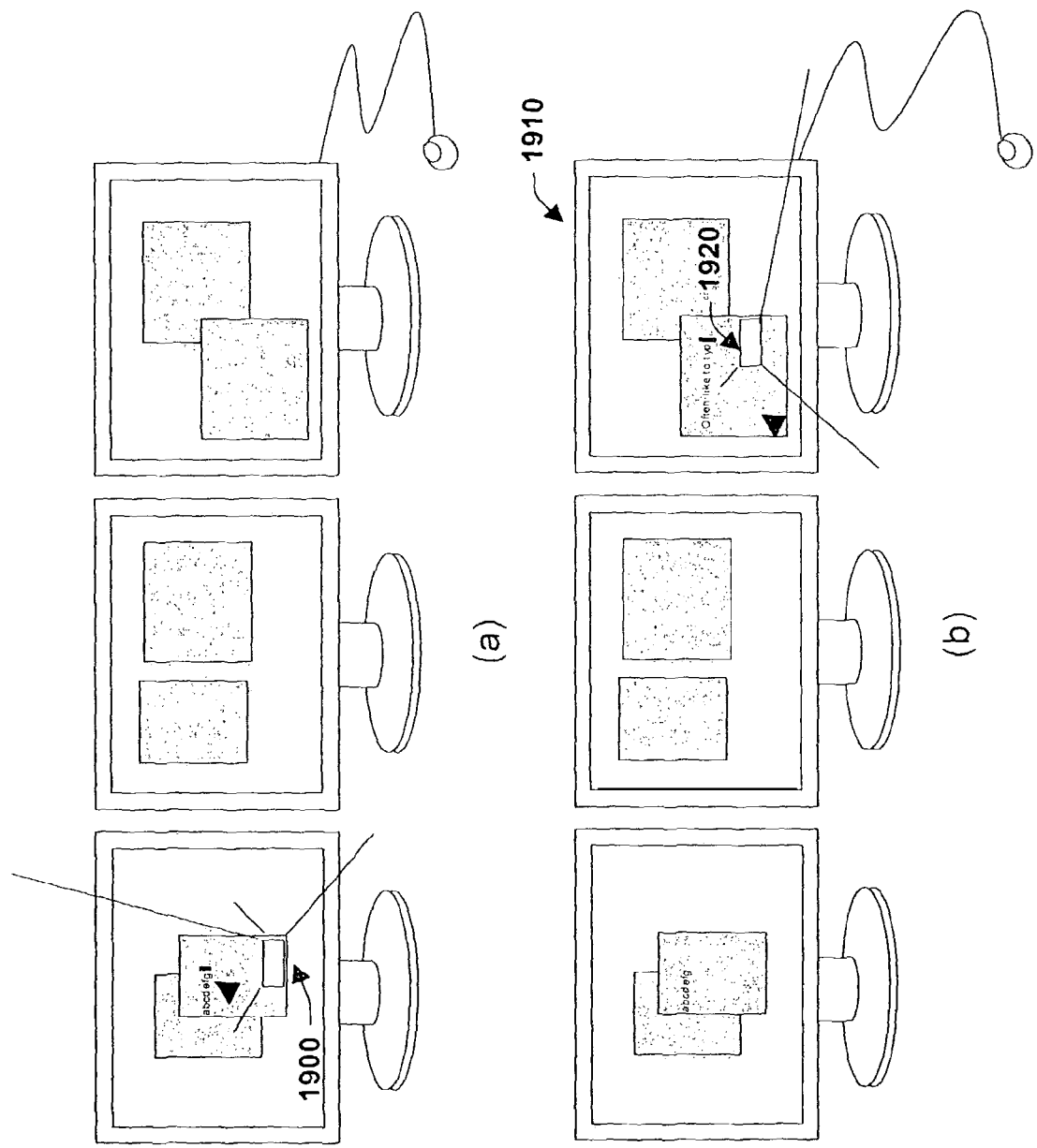
FIG. 19 illustrates multiple monitor herald movement in accordance with an aspect of the present invention.

FIG. 19 illustrates multiple monitor herald movement in accordance with an aspect of the present invention. In this aspect, the user may have at their disposal more than one monitor from which to execute applications. In the multi-monitor situation, clues or information can come from a current active window or from a model of attention based on head pose and/or gaze. For example, in a three-monitor situation, a herald arrives at a first monitor at 1900. However, via head or gaze tracking components that determine where the user's focus of attention currently resides, it is determined that the user is currently directing their attention to a third monitor at 1910, wherein the herald from 1900 is automatically positioned at or near the user's focus of attention at 1920.

Spatial and temporal constraints can be considered based on the type of software application, the configuration of displayed information associated with the application, and the current or recent specific interactions with the content, so as to ensure that a herald will not obfuscate important content or disrupt a current interaction, so as to minimize the disruptiveness of the rendering of the herald. For example, the output of a system that moves a herald up towards the height of the position of a current interaction, along the right-hand edge of the active window can be modified to ensure that the herald will not be placed in a position that will overlay the position where a user is currently typing, e.g. a "repellent force field" can be positioned over a user's current work position to ensure that there will not be obfuscation. Thus, a herald can inch up to be as close as possible to the user but avoid being overlayed in a disruptive position. Likewise the current activity can be considered, and a brief "temporal force field" can be applied to delay the rendering. For example, the rendering can be delayed until the current typing sequence comes to an end in a Word processing application, or until a graphic being moved in a graphics application is positioned.

Figure 20:
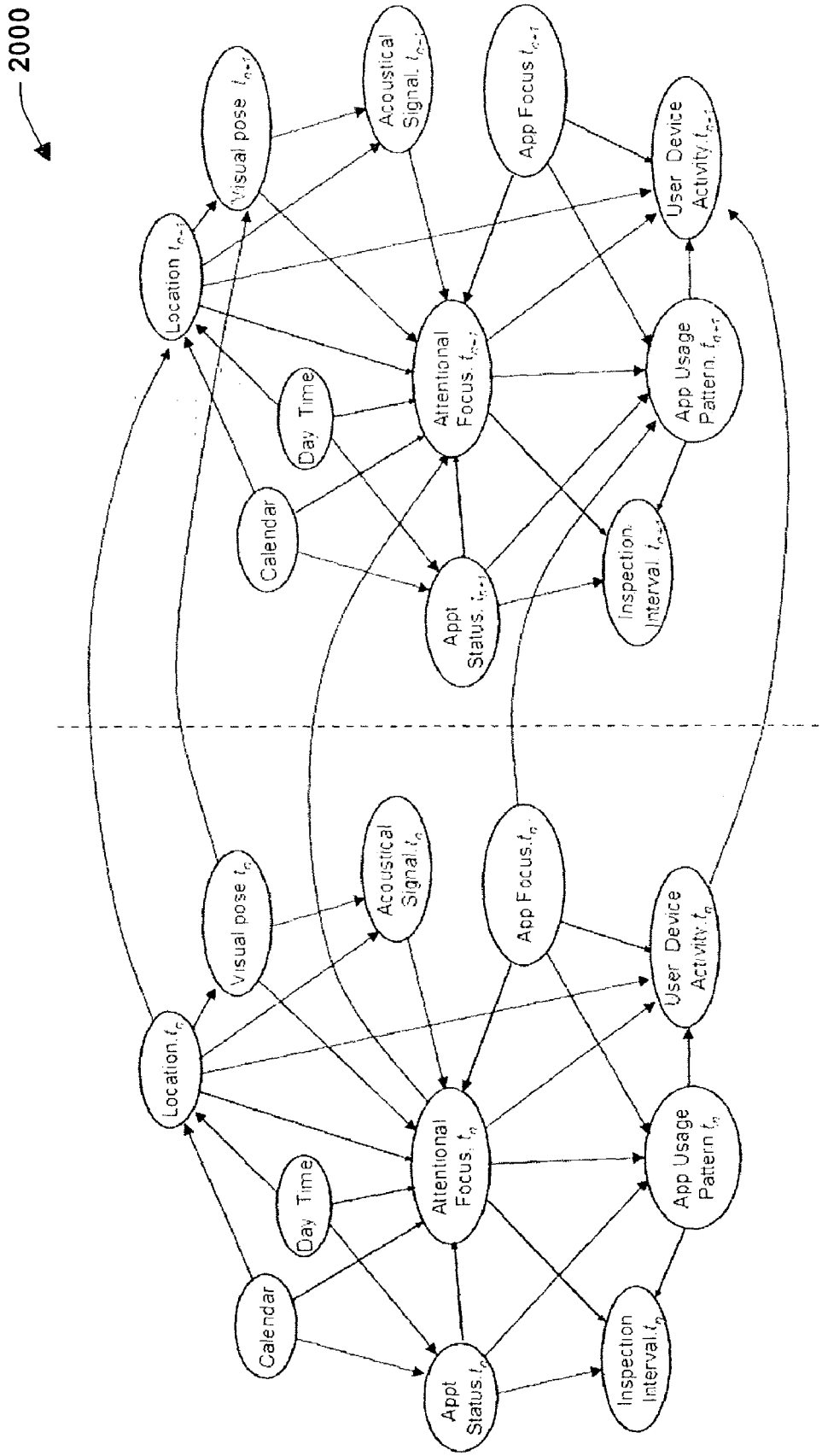
FIG. 20 is a diagram illustrating a dynamic Bayesian model in accordance with an aspect of the present invention.

FIGS. 20-24 describe modeling aspects for determining user activities and states in accordance with the present invention. FIG. 20 is a diagram 2000 illustrating a dynamic Bayesian model for reasoning about a user's attentional focus capturing key variables and dependencies in accordance with an aspect of the present invention. Initial versions of an alerting mediation system employed handcrafted dynamic Bayesian network models as illustrated in the diagram 2000, wherein respective models can also be dynamically generated based upon user specifications. A critical variable considered in the Bayesian network is attentional focus. The states of this variable were structured into approximately fifteen (or other number) mutually exclusive states of attention, capturing a spectrum of user situations that segmented contexts by workload. The states include such distinctions as high-focus solo activity, medium focus solo activity, low focus solo activity, conversation in office, presentation, driving, private personal time, and sleeping, for example.

A goal of the models of attention is to infer the cost of different types of interruption given that a user is of a particular attentional state. To achieve this, the present invention considers the utility, $u(D_i, A_j)$, capturing the cost of a user in attentional state $A_j$ being disrupted by task or communication event $D_i$. This cost can be assessed as the willingness to pay to avoid a disruption in dollars for each combination. Given a set of dollar values to avoid disruptions, and a probability distribution being inferred over the attentional state of a user, an expected cost of interruption (ECI) can be computed by summing over the utilities, weighted by the likelihood of each state of attention, conditioned on the stream of incoming sensory information. That is, the ECI is $$ECI = \sum_j p(A_i \mid E) u(D_i, A_j)$$

wherein $p(A_j|E)$ is the probability of the attentional state, conditioned on an evidence stream E.

Figure 21:
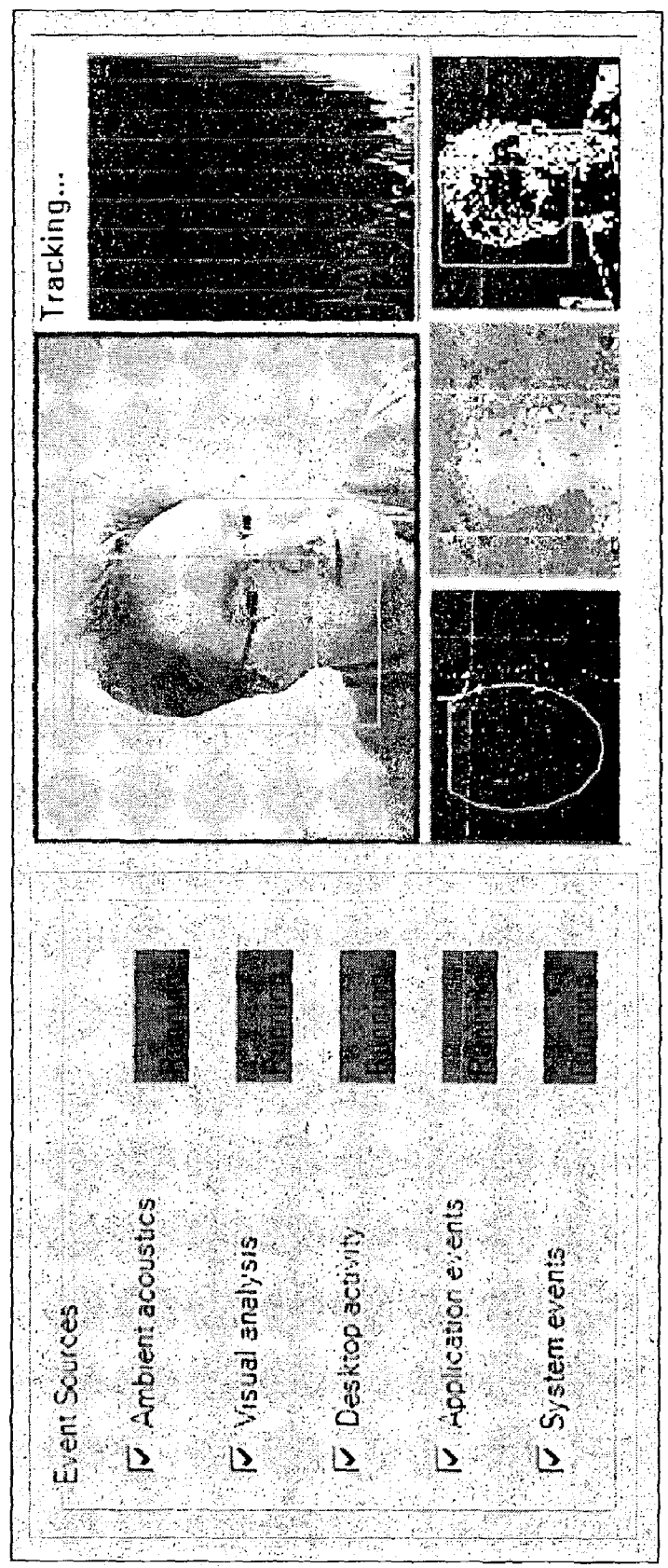
FIG. 21 is a diagram illustrating a control panel for an event system in accordance with an aspect of the present invention.

FIG. 21 is a diagram 2100 illustrating a control panel for an event system showing event classes and graphical display of processing acoustical and visual information in accordance with an aspect of the present invention. The interface depicted at 2100 considers additional details of a real-world implementation of a system that can provide the cost of interruption from a stream of sensory information. In this example, the activity of a user monitored interacting with a client device with an event sensing and abstraction system that senses computer events from an operating system and applications executed on the client. In addition a visual pose is processed with a Bayesian head tracking system and ambient acoustical activity with an audio signal processing analysis. Finally, a user's calendar is automatically examined via an interface to an electronic calendar application (e.g., Outlook) to determine if a meeting is scheduled. FIG. 21 displays an event monitoring and control system named Inflow which is described in more detail below.

A client event system provides an abstraction tool for coalescing patterns of low-level system events into higher-level events. The present invention considers in the models of attention both low-level and high-level events. For example, low-level states can be captured as the application being used, whether the user is typing, clicking with the mouse, as well as a set of higher-level events such as the pattern of switching among applications (e.g., single application focus versus switching among applications), indications of task completion (e.g., a message being sent, a file being closed, an application being closed, etc.).

For the calendar events, whether a meeting is in progress can be considered, the length of time until the meeting is over, and the location of the meeting. For the acoustical and visual analysis, it can be determined whether conversation or other signal is identified, and whether a user is present near a desktop system, and if so, if the user is gazing at or away from the computer.

Figure 22:
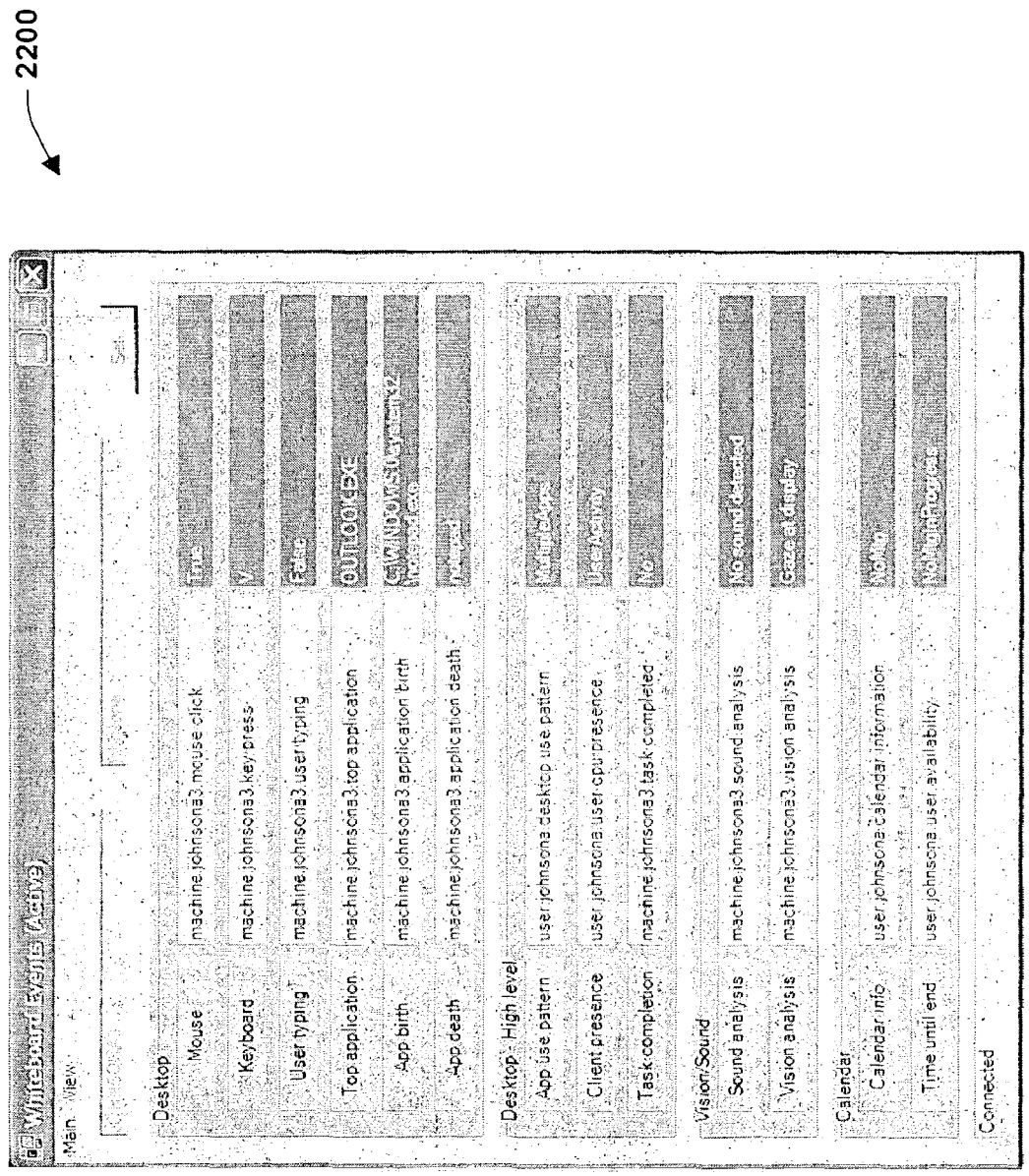
FIG. 22 is a diagram illustrating an event whiteboard in accordance with an aspect of the present invention.

FIG. 22 is a diagram illustrating an event whiteboard 2200 in accordance with an aspect of the present invention. The event whiteboard 2200 is employed to capture and share out the state of low-level and higher-level events considered by the system. As indicated in the diagram, events include details about the birth and death of applications, the application currently "on top" and being interacted with, and events that capture usage patterns such as the desktop usage pattern, in this case, showing that a user is switching between different applications within a preset time horizon (of 15 seconds in this case).

FIG. 23 is a diagram 2300 illustrating inferences about attentional states and expected cost of interruption over time in accordance with an aspect of the present invention. The Inflow system described above considers various events and employs a dynamic Bayesian network to infer a probability distribution over attentional states. An output at 2310 depicts the output of a model that considers eight states of attention, including, High-Focus Solo Activity, Low-Focus Solo Activity, Conversation in Office, Presentation or Meeting, Driving, Private Personal Time, Sleeping, and Now Available. The output 2310 illustrates that the initial high likelihood of Conversation in Office has at the most recent time become dominated by High-Focus Solo Activity.

An output 2320 depicts inferences about the expected cost of interruption over time for different disruptions $D_i$. In this case, it can be computed, from the inferred probability distribution over the coarse user attentional states the expected dollars a user would be willing to pay to avoid different communication events. The curves in the diagram 2320 represent, from top to bottom, the expected costs associated with six different interruptions, including a telephone call, a pager, a full visual alert with audio chime herald, a thumbnail display with audio chime, a full visual alert without the chime, and a thumbnail display without chime.

Figure 24:
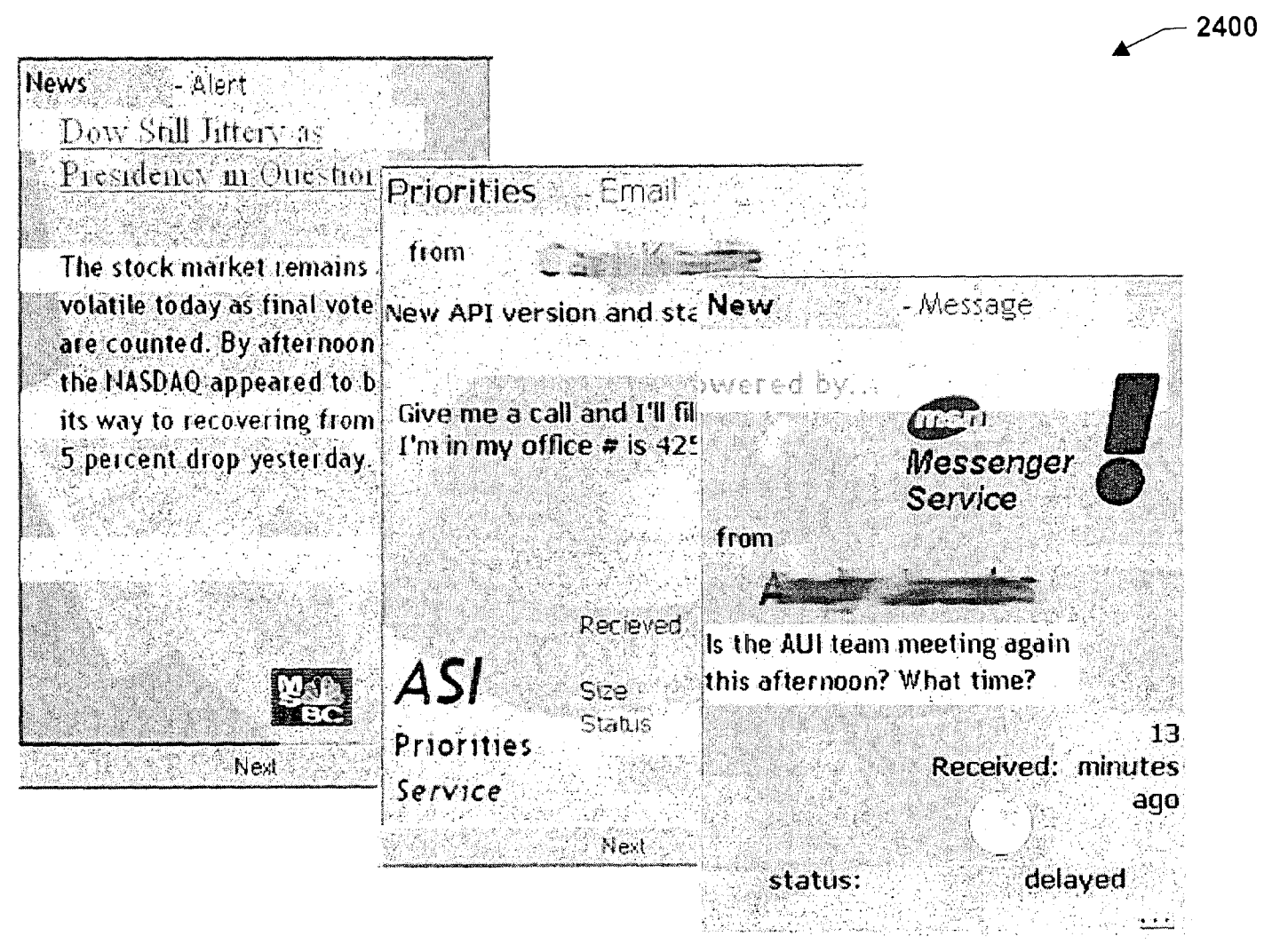

FIG. 24 is a diagram 2400 illustrating alerting displays in accordance with an aspect of the present invention. The diagram 2400 displays an example of the visual display of a full visual alert in a notification system employing models of expected cost of interruption (e.g., notifications regarding news, financial, e-mail, instant messages, and so forth). The alert may be coupled with an audio and/or visual herald. The present invention can balance such an inferred expected cost for different messaging actions with the expected value of different communications, as assessed in a separate analysis of the value of information.

Figure 25:
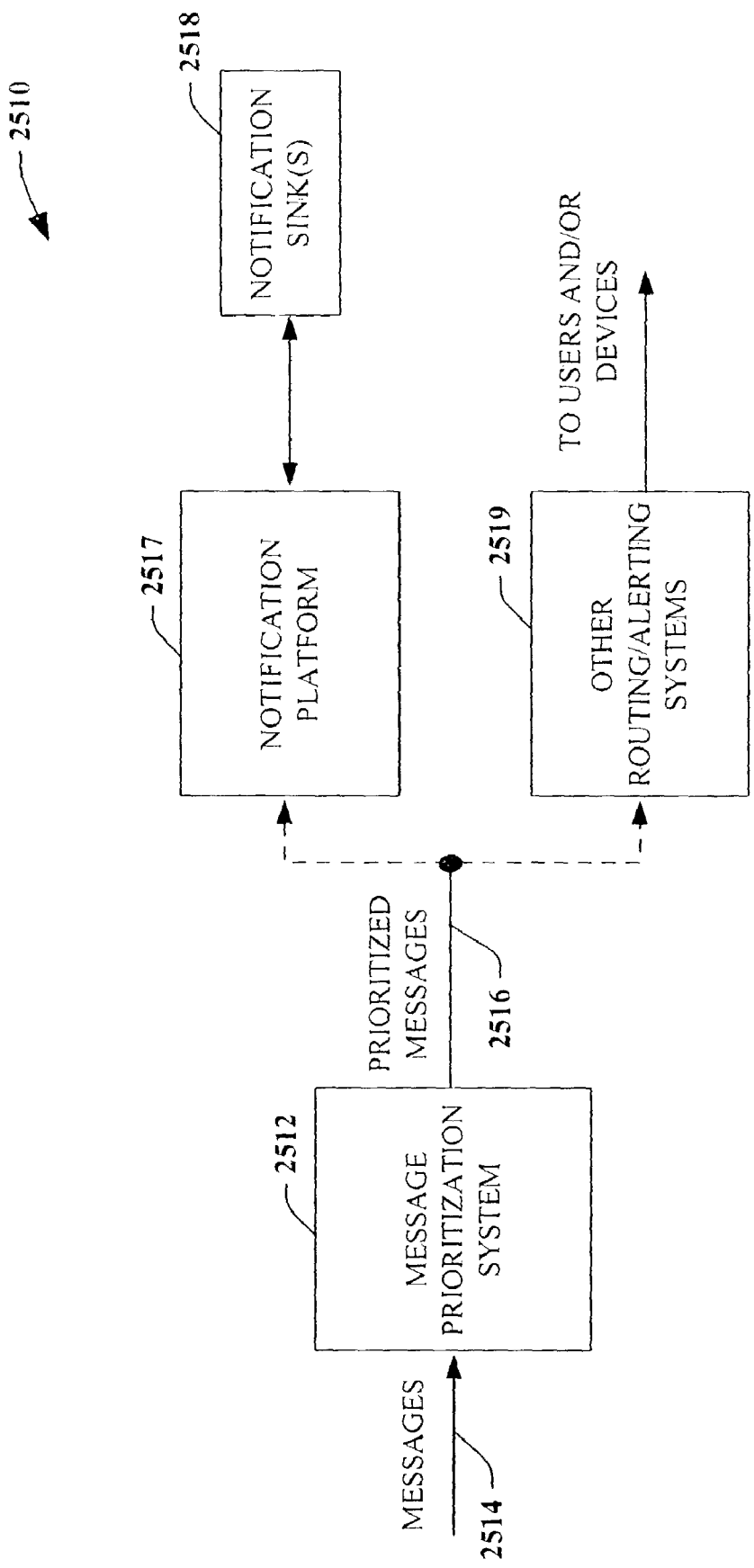
FIG. 25 is a schematic diagram illustrating a prioritization system in accordance with an aspect of the present invention.

Referring to FIG. 25, a system 2510 illustrates a prioritization system 2512 and notification architecture in accordance with an aspect of the present invention. The prioritization system 2512 receives one or more messages or notifications 2514, generates a priority or measure of importance (e.g., probability value that the message is of a high or low importance) for the associated message, and provides the one or more messages with an associated priority value at an output 2516. As will be described in more detail below, classifiers can be constructed and trained to automatically assign measures of prioritization to the messages 2514. For example, the output 2516 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 2517 can be employed in conjunction with the prioritization system 2512 to direct prioritized messages to one or more notification sinks accessible to users. As will be described in more detail below, the notification platform 2517 can be adapted to receive the prioritized messages 2516 and make decisions regarding when, where, and how to notify the user, for example. As an example, the notification platform 2517 can determine a communications modality (e.g., current notification sink 2518 of the user such as a cell phone, or Personal Digital Assistant (PDA)) and likely location and/or likely focus of attention of the user. If a high importance e-mail were received, for example, the notification platform 2517 can determine the users location/focus and direct/reformat the message to the notification-sink 2518 associated with the user. If a lower priority message 2516 were received, the notification platform 2517 can be configured to leave the e-mail in the user's in-box for later review as desired, for example. As will be described in more detail below, other routing and/or alerting systems 2519 may be utilized to direct prioritized messages 2516 to users and/or other systems.

Figure 26:
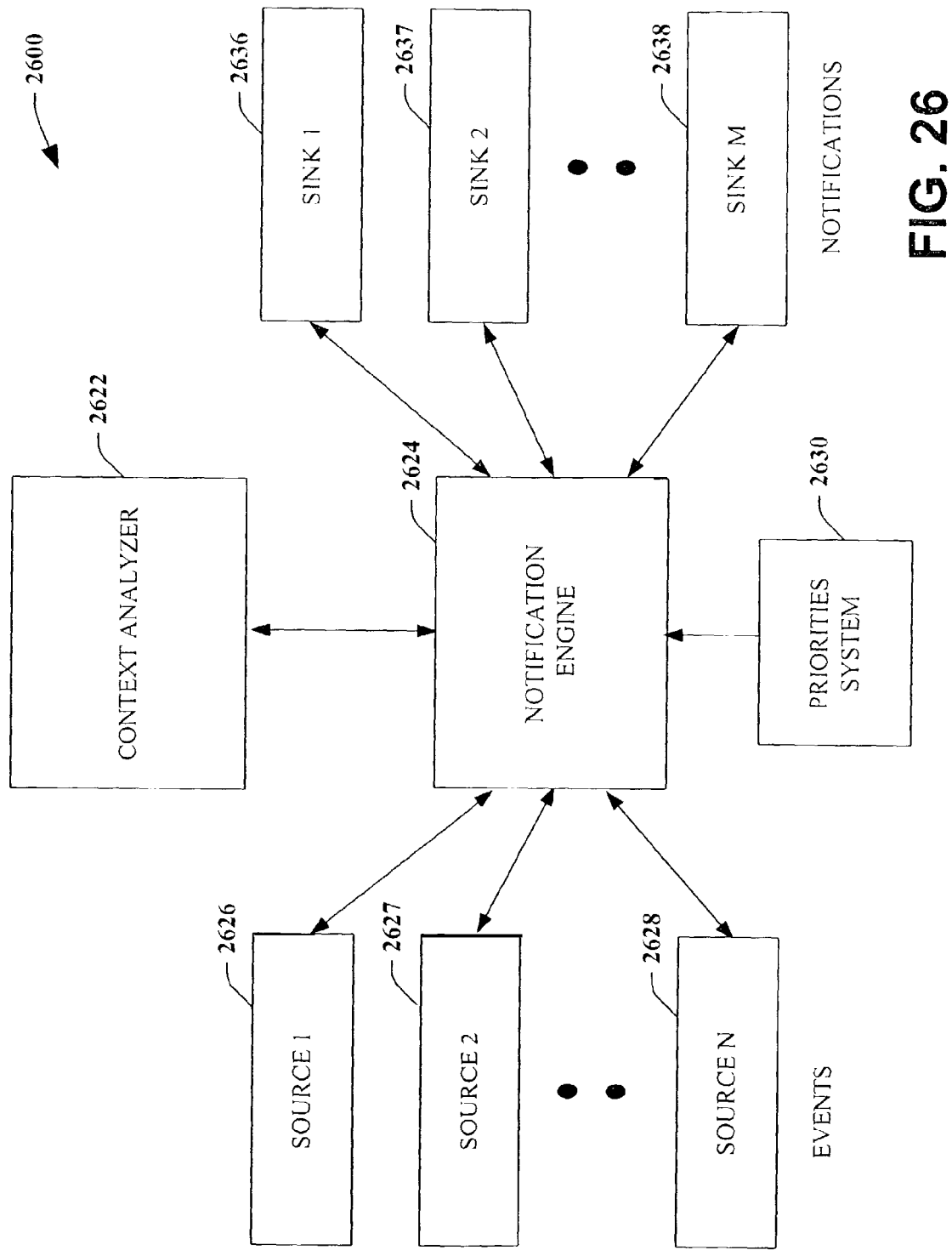
FIG. 26 is a schematic block diagram illustrating systematic cooperation between a notification engine and a context analyzer according to an aspect of the present invention.

Turning now to FIG. 26, a system 2600 illustrates how a notification engine and context analyzer function together according to an aspect of the present invention. The system 2600 includes a context analyzer 2622, a notification engine 2624, one or more notification sources 1 through N, 2626, 2627, 2628, a prioritization system 2630, which can operate as a notification source, and one or more notification sinks, 1 through M, 2636, 2637, 2638, wherein N an M are integers, respectively. The sources are also referred to as event publishers, while the sinks are also referred to as event subscribers. There can be any number of sinks and sources. In general, the notification engine 2624 conveys notifications, which are also referred to as events or alerts, from the sources 2626-2628 to the sinks 2636-2638, based in part on parametric information stored in and/or accessed by the context analyzer 2622.

The context analyzer 2622 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 2624, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 2622, according to one aspect of the present invention is inclusive of contextual information determined by the analyzer. The contextual information is determined by the analyzer 2622 by discerning the user's location and attentional status based on one or more contextual information sources (not shown), as is described in more detail in a later section of the description. The context analyzer 2622, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 2626-2628, 2630 generate notifications intended for the user and/or other entity. For example, the sources 2626-2628 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the prioritization system 2630 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 2626-2628 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;

computer systems (e.g., that may alert the user with messages that information about alerts about system activity or problems);

Internet-related services, appointment information, scheduling queries;

changes in documents or numbers of certain kinds of documents in one or more shared folders;

availability of new documents in response to standing or persistent queries for information; and/or, information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 2636-2638 are able to provide notifications to the user. For example, such notification sinks 2636-2638 can include computers, such as desktop and/or laptop computers, handheld computers, cell phones, landline phones, pagers, automotive-based computers, as well as other systems/applications as can be appreciated. It is noted that some of the sinks 2636-2638 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 2624 accesses the information stored and/or determined by the context analyzer, and determines which of the notifications received from the sources 2626-2628 to convey to which of the sinks 2636-2638. Furthermore, the notification engine 2624 can determine how the notification is to be conveyed, depending on which of the sinks 2636-2638 has been selected to send the information to. For example, it may be determined that notifications should be summarized before being provided to a selected sinks 2636-2638.

The invention is not limited to how the engine 2624 makes its decisions as to which of the notifications to convey to which of the notification sinks, and in what manner the notifications are conveyed. In accordance with one aspect, a decision-theoretic analysis can be utilized. For example, the notification engine 2624 can be adapted to infer important uncertainties about variables including a user's location, attention, device availability, and amount of time until the user will access the information if there were no alert. The notification engine 2624 can then make notification decisions about whether to alert a user to a notification, and if so, the nature of the summarization and the suitable device or devices to employ for relaying the notification. In general, the notification engine 2624 determines the net expected value of a notification. In doing so, it can consider the following:

the fidelity and transmission reliability of each available notification sink;

the attentional cost of disturbing the user;

the novelty of the information to the user;

the time until the user will review the information on his or her own;

the potentially context-sensitive value of the information; and/or, the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 2624 can make decisions as to one or more of the following:

what the user is currently attending to and doing (based on, for example, contextual information, including head pose and/or gaze as tracked by gaze tracking machinery);

where the user currently is;

how important the information is;

what is the cost of deferring the notification;

how distracting would a notification be;

what is the likelihood of getting through to the user; and, what is the fidelity loss associated with the use of a specific mode of a given notification sink.

Therefore, the notification engine 2624 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 2624 can access information stored in a user profile by the context analyzer 2622 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 2624 determines how and whether to notify the user.

According to one aspect of the present invention, the notification platform architecture 2600 can be configured as a layer that resides over an eventing or messaging infrastructure. However, the invention is not limited to any particular eventing infrastructure.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks such as endpoint devices receive notifications, alerts and events, for example. The present invention is not so limited, however.

Figure 27:
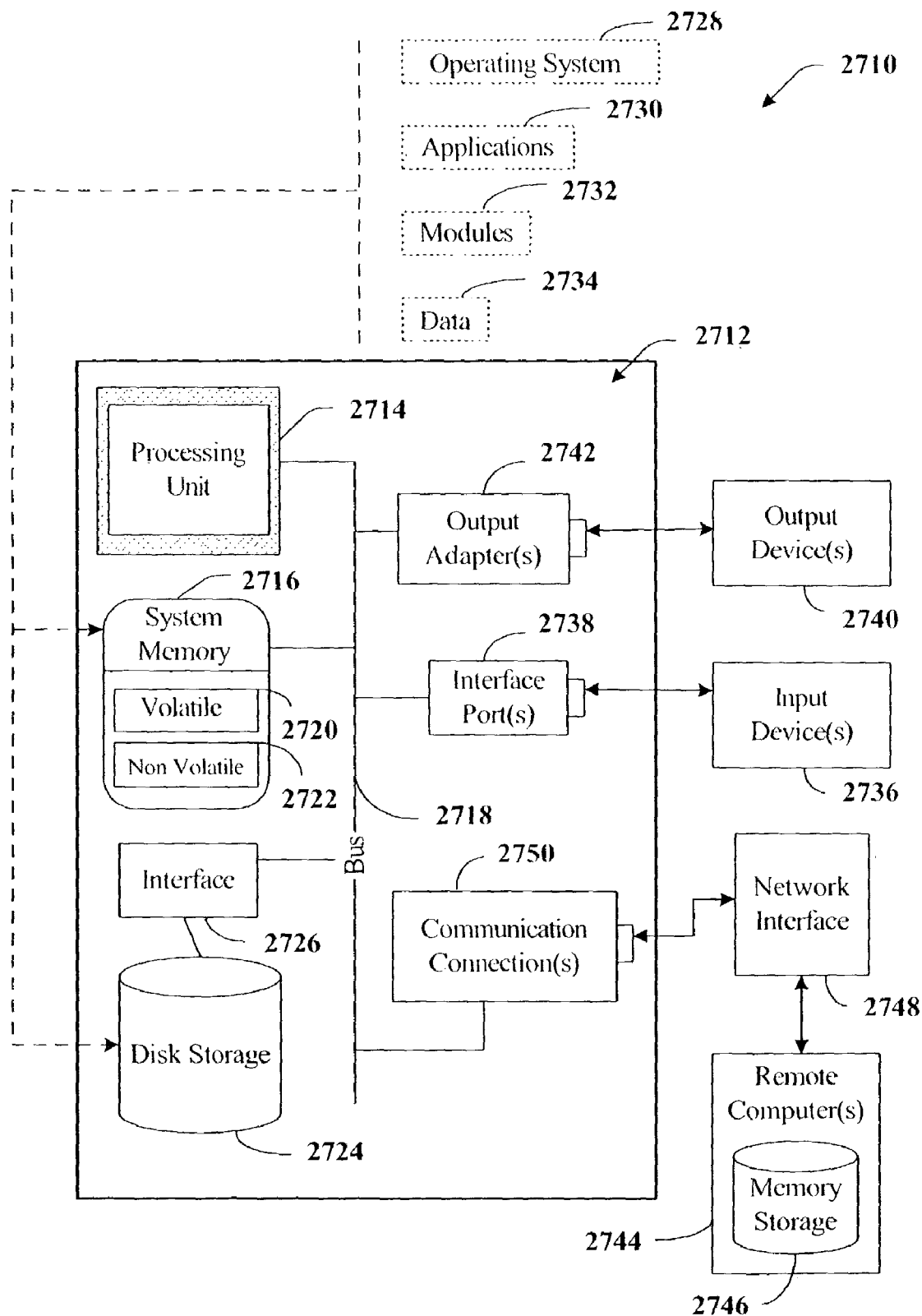
FIG. 27 is a schematic block diagram illustrating a suitable operating environment in accordance with an aspect of the present invention.

With reference to FIG. 27, an exemplary environment 2710 for implementing various aspects of the invention includes a computer 2712. The computer 2712 includes a processing unit 2714, a system memory 2716, and a system bus 2718. The system bus 2718 couples system components including, but not limited to, the system memory 2716 to the processing unit 2714. The processing unit 2714 can be any of various available processors. Dual microprocessors and other multi-processor architectures also can be employed as the processing unit 2714.

The system bus 2718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2716 includes volatile memory 2720 and nonvolatile memory 2722. The basic input/output system (BIOS), containing the basic routines to transfer information between elements within the computer 2712, such as during start-up, is stored in nonvolatile memory 2722. By way of illustration, and not limitation, nonvolatile memory 2722 can include read only memory (ROM), programmable ROM (PROM), electrically programmable ROM (EPROM), electrically erasable ROM (EEPROM), or flash memory. Volatile memory 2720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2712 also includes removable/non-removable, volatile/non-volatile computer storage media. FIG. 27 illustrates, for example a disk storage 2724. Disk storage 2724 includes, but is not limited to, devices like a magnetic disk drive, floppy disk drive, tape drive, Jaz drive, Zip drive, LS-100 drive, flash memory card, or memory stick. In addition, disk storage 2724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2724 to the system bus 2718, a removable or non-removable interface is typically used such as interface 2726.

It is to be appreciated that FIG. 27 describes software that acts as an intermediary between users and the basic computer resources described in suitable operating environment 2710. Such software includes an operating system 2728. Operating system 2728, which can be stored on disk storage 2724, acts to control and allocate resources of the computer system 2712. System applications 2730 take advantage of the management of resources by operating system 2728 through program modules 2732 and program data 2734 stored either in system memory 2716 or on disk storage 2724. It is to be appreciated that the present invention can be implemented with various operating systems or combinations of operating systems.

A user enters commands or information into the computer 2712 through input device(s) 2736. Input devices 2736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2714 through the system bus 2718 via interface port(s) 2738. Interface port(s) 2738 include, for example, a serial port, a parallel port, a game port, and a universal serial bus (USB). Output device(s) 2740 use some of the same type of ports as input device(s) 2736. Thus, for example, a USB port may be used to provide input to computer 2712, and to output information from computer 2712 to an output device 2740. Output adapter 2742 is provided to illustrate that there are some output devices 2740 like monitors, speakers, and printers, among other output devices 2740 that require special adapters. The output adapters 2742 include, by way of illustration and not limitation, video and sound cards that provide a means of connection between the output device 2740 and the system bus 2718. It should be noted that other devices and/or systems of devices provide both input and output capabilities such as remote computer(s) 2744.

Computer 2712 can operate in a networked environment using logical connections to one or more remote computers, such as remote computer(s) 2744. The remote computer(s) 2744 can be a personal computer, a server, a router, a network PC, a workstation, a microprocessor based appliance, a peer device or other common network node and the like, and typically includes many or all of the elements described relative to computer 2712. For purposes of brevity, only a memory storage device 2746 is illustrated with remote computer(s) 2744. Remote computer(s) 2744 is logically connected to computer 2712 through a network interface 2748 and then physically connected via communication connection 2750. Network interface 2748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2750 refers to the hardware/software employed to connect the network interface 2748 to the bus 2718. While communication connection 2750 is shown for illustrative clarity inside computer 2712, it can also be external to computer 2712. The hardware/software necessary for connection to the network interface 2748 includes, for exemplary purposes only, internal and external technologies such as, modems including regular telephone grade modems, cable modems and DSL modems, ISDN adapters, and Ethernet cards.

Figure 28:
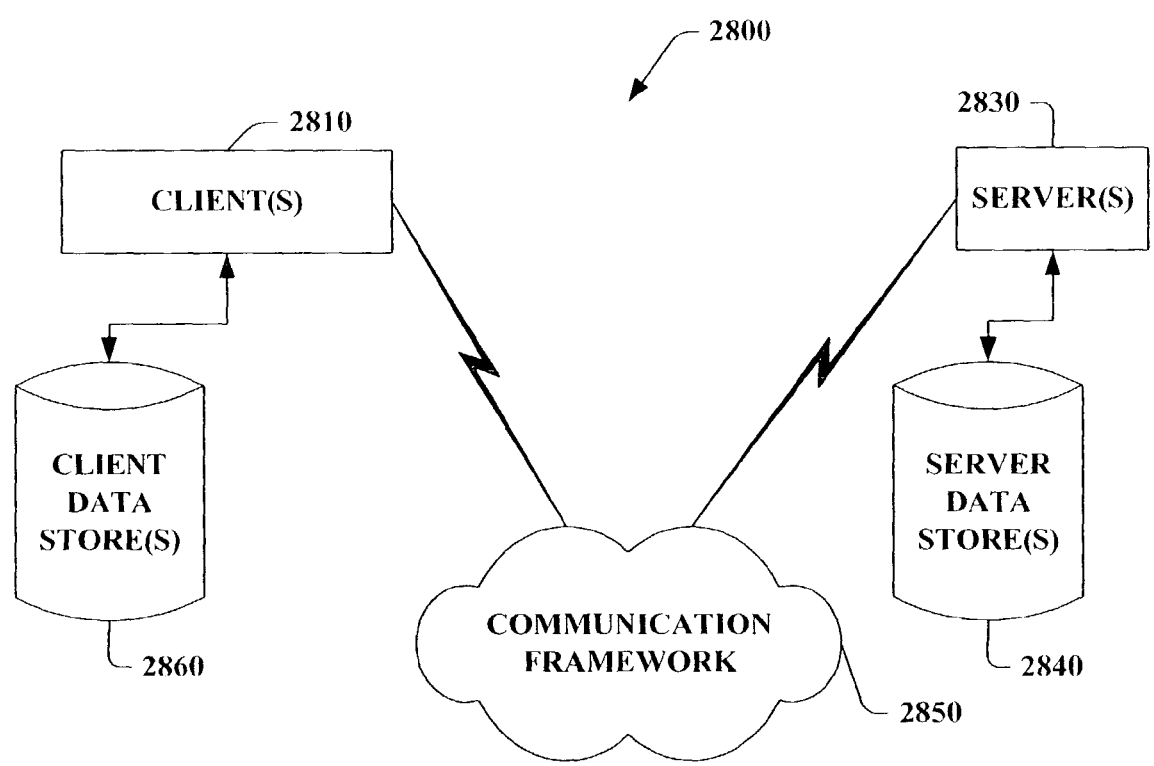
FIG. 28 is a schematic block diagram of a sample-computing environment with which the present invention can interact.

FIG. 28 is a schematic block diagram of a sample-computing environment 2800 with which the present invention can interact. The system 2800 includes one or more client(s) 2810. The client(s) 2810 can be hardware and/or software (e.g., threads, processes, computing devices). The system 2800 also includes one or more server(s) 2830. The server(s) 2830 can also be hardware and/or software (e.g., threads, processes, computing devices). The servers 2830 can house threads to perform transformations by employing the present invention, for example. One possible communication between a client 2810 and a server 2830 may be in the form of a data packet adapted to be transmitted between two or more computer processes. The system 2800 includes a communication framework 2850 that can be employed to facilitate communications between the client(s) 2810 and the server(s) 2830. The client(s) 2810 are operably connected to one or more client data store(s) 2860 that can be employed to store information local to the client(s) 2810. Similarly, the server(s)

2830 are operably connected to one or more server data store(s) 2840 that can be employed to store information local to the servers 2830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A notification system embodied on a computer-readable storage medium, comprising computer-executable instructions that, when executed on a computer, implement:
    a component that generates a notification to a user of the computer when displayed on a display screen of one or more display screens of the computer, the notification being associated with a message having an assigned urgency; and
    an information controller that:
        receives attentional inputs associated with the user and determines the user's current activity and focus of attention based on the attentional inputs,
        dynamically selects a location on the one or more display screens based on the user's current activity and focus of attention and the assigned urgency; and
        presents an information herald representing the notification in the selected location,
        wherein the selected location is such that the distance of the information herald from the user's focus of attention decreases as the urgency increases.

2. The system of claim 1, the information controller receives inputs regarding user activities and employs one or more attention models to generate one or more dynamic outputs to control how the information herald is provided to users at a workspace.

3. The system of claim 2, the information herald operates at various locations in the workspace and receives dynamically adjustable data from the information controller in order to control the location and format of the information herald.

4. The system of claim 2, the information controller provides attention-sensitive placement and configuration of the information herald based on a user's activity via the attention models or other inputs about focus of visual attention including gaze and pose information.

5. The system of claim 1, the information controller removes the information herald after some threshold time or fades the information herald from view over time.

6. The system of claim 1, the information herald provides more detailed information when a user selects the information herald via an input command.

7. The system of claim 6, the input command includes at least one of a keystroke, mouse click, a mouse hover, and or voice command.

8. The system of claim 1, the information controller includes controls for timing out after a wait period, allowing users to continue to work with or without a glance at the information herald.

9. The system of claim 8, the information controller processes an implicit signal from users that they are not interested by information presented in the information herald without requiring an explicit user action.

10. The system of claim 1, the information controller includes at least one of a dynamic positioning control, a dynamic sizing control, a dynamic content control, a dynamic rendering control, a dynamic audio control, a dynamic timing control, and or a dynamic fading control.

11. The system of claim 10, the dynamic rendering control changes the appearance of the information herald or content therein based on the urgency value and the user's determined activity, the appearance including at least one of colors, shapes, and or fonts.

12. The system of claim 1, the information herald is dynamically adjusted to an iconic form based upon the summarized notification or an action by the user.

13. The system of claim 1, the summarized notifications include at least one of a line of message, a message chunk, or a message outline.

14. The system of claim 1, the information herald is dynamically positioned based upon an automatically determined urgency value for a notification.

15. The system of claim 1, further comprising an audio herald that is controlled by the information controller using auditory cues that represent the urgency of an incoming message.

16. The system of claim 15, the information controller only uses the audio herald, or adds an audio cue when no user is detected.

17. The system of claim 1, the information controller employs a dwell time for display of the information herald whose duration dynamically adjusts based on at least one of the distance of the herald's display location from the user's focus of attention or the user's workload.

18. The system of claim 17, the information herald is appended to a herald journal or folder after a predetermined time, the herald journal or folder allowing a user to inspect the information herald at a later time.

19. A system embodied on a computer-readable storage medium that facilitates message processing by a user, comprising:
    means for automatically prioritizing a message;
    means for generating a herald containing a summary of the message;
    means for determining a user's current focus of attention;
    means for dynamically locating the herald in a user's workspace;
    means for expanding the information relating to the message presented in the user's workspace based on a user input involving the herald,
    wherein:
        the priority of the message increases as time passes without the user providing the user input involving the herald; and
        the means for dynamically locating the herald locates the herald such that the distance between the herald location and the user's focus of attention decreases with increasing message priority.

20. The system of claim 19, further comprising means for analyzing the users activities in order to dynamically locate the message.

21. A method for automatically notifying a user, comprising:
    operating a processor to perform a method comprising:
        automatically determining an output region of a display for a message;
        automatically determining a priority for the message;
        automatically placing the message in the output region;

automatically determining a focus of attention of a user;
automatically placing the output region in a default region of a workspace;
increasing the priority of the message based on a passage of time; and
dynamically moving the output region, the output region being spaced relative to the determined focus of attention such that:
the separation between the output region and the focus of attention decreases as the priority of the message increases; and
the output region is separated from the focus of attention such that the output region does not overlay a current work position.

22. The method of claim 21, further comprising automatically locating the output region based upon the priority.

23. The method of claim 21, further comprising automatically changing the appearance of the output region based upon at least one of the priority or the user's detected activities.

24. The method of claim 21, further comprising automatically applying at least one control to dynamically change the output region, the at least one control associated with at least one of a position, a size, a content, an appearance, a sound, or a time.

25. The method of claim 21, further comprising automatically summarizing the message prior to placing the message in the output region.

26. The method of claim 21, further comprising automatically moving content associated with the output region to an electronic journal for deferred review.

27. The method of claim 21, the detected activities are determined in accordance with the model.

28. The method of claim 27, the model processes at least one of a location, a visual pose, a calendar, a time, an appointment status, an acoustical signal, an application in focus, an inspection interval, an application usage pattern, and or user device activity to determine an attentional focus of a user.

29. A method for controlling notifications to a user, comprising:
operating at least one processor to perform a method comprising:
monitoring a user's activities;
determining an attentional state of the user based on the user's activities;
determining a location on a display of the user's current focus of attention;
constructing an attention model to analyze the user's activities, the attention model analyzes a utility capturing a cost of a user in an attentional state being disrupted by a task or communication event;
selecting a distance based at least in part on the utility generated from the attention model; and
dynamically placing information alerts within a workspace at the selected distance from the user's current focus of attention.

30. The method of claim 29, the cost is assessed as a willingness to pay to avoid a disruption in dollars for a respective combination of disruptions.

31. The method of claim 29, further comprising computing an expected cost of interruption (ECI) by summing over utilities, weighted by a likelihood of respective states of attention, conditioned on a stream of incoming sensory information, wherein ECI is stated as:

$$ECI = \sum_j p(A_i \mid E)u(D_i, A_j)$$

wherein:
u($D_i$,$A_j$) is the utility;
$A_i$ is the attentional state;
$D_i$ is the task or communication event; and
p($A_j$|E) is the probability of an attentional state, conditioned on an evidence stream E.

32. A method for controlling notifications to a user, comprising:
monitoring a user's activities;
determining a focus of attention of the user based on the monitored activities;
providing one or more user controls on a display, the user controls allowing a user to configure preferences regarding how the herald is displayed, and the preferences including at least a setting that allows a user to specify a threshold herald priority level below which a herald will remain at a periphery of the display;
determining a priority for a received herald;
dynamically controlling the display location of the received herald, the dynamically controlling comprising:
when the priority of the received herald is below the threshold level, displaying the herald at a location on the periphery of the display; and
when the priority of the received herald is above the threshold level, displaying the herald at a location that is a distance from the user's determined focus of attention selected based at least in part on the priority.

33. The method of claim 32, further comprising providing an entry point into the user controls for the herald for configuring policies regarding positioning and rendering of the heralds.

34. The method of claim 32, further comprising providing a particular region or button with the herald that allows entry into controls for adjustment in general or for the case at hand.

35. The method of claim 32, the one or more user controls comprise a rich control panel for specifying preferences about heralds.

36. The method of claim 32, further comprising controls for opening and closing complex structures associated with the herald.

37. The method of claim 32, the controls include general gestures that enables users to ignore the herald for a time period.

38. The method of claim 37, the controls are coupled with a "snooze" feature, allowing user to indicate a predetermined period for the herald to return.

39. The method of claim 32, the herald is dynamically positioned with respect to the user's determined focus of attention based upon an urgency associated with a message.

40. The method of claim 32, further comprising automatically providing a list of heralds that have been missed while a user has been detected to be away.

41. The method of claim 40, further comprising providing a time-out function based upon a determined importance of the heralds appearing in the list of herald.

42. The method of claim 41, further comprising sorting important heralds into a first folder and time-out heralds in a subsequent folder.

43. The method of claim 32, further comprising automatically analyzing spatial and temporal constraints that are based on a type of software application, a configuration of displayed information associated with the application, or current or recent specific interactions with application content.

44. The method of claim 43, the constraints are employed to ensure that a herald does not obfuscate important content or disrupt a current interaction and to minimize the disruptiveness of a rendering of the herald.

45. The method of claim 43, further comprising automatically positioning a keep out area over selected portions of a user's display or displays to ensure that a herald is not placed in a position that will overlay a position where a user is currently working.

46. The method of claim 45, further comprising processing a user's current activity and providing a brief temporal keep out area that is applied to delay a herald rendering.

* * * * *